United States Patent
Wilhite et al.

(10) Patent No.: US 8,298,499 B2
(45) Date of Patent: Oct. 30, 2012

(54) PROCESS INTENSIFICATION IN MICROREACTORS

(75) Inventors: Benjamin A. Wilhite, Storrs, CT (US); Angela M. Moreno, Coventry, CT (US); Daejin Kim, Vernon, CT (US)

(73) Assignee: University of Connecticut, Farmington, CT (US)

( * ) Notice: Subject to any disclaimer, the term of this patent is extended or adjusted under 35 U.S.C. 154(b) by 915 days.

(21) Appl. No.: 12/263,637

(22) Filed: Nov. 3, 2008

(65) Prior Publication Data

US 2009/0238751 A1    Sep. 24, 2009

Related U.S. Application Data

(60) Provisional application No. 61/001,578, filed on Nov. 2, 2007.

(51) Int. Cl.
  *B01J 10/00* (2006.01)
  *B01J 12/00* (2006.01)
  *B01J 19/00* (2006.01)
  *C01B 3/22* (2006.01)
  *C01B 3/24* (2006.01)

(52) U.S. Cl. ........ 422/607; 422/601; 423/650; 423/652; 423/659

(58) Field of Classification Search .................. 423/376, 423/659, 648.1, 650, 652; 422/129–242, 422/601, 607
See application file for complete search history.

(56) References Cited

U.S. PATENT DOCUMENTS

| | | | |
|---|---|---|---|
| 3,406,435 A | 10/1968 | Dietzsch | |
| 4,271,110 A | 6/1981 | Minjolle | |
| 5,785,942 A * | 7/1998 | Hippel et al. | 423/376 |
| 6,005,143 A | 12/1999 | Machado | |
| 6,077,436 A | 6/2000 | Rajnik | |
| 6,254,822 B1 | 7/2001 | Brundage | |
| 6,365,259 B1 | 4/2002 | Brundage | |
| 6,534,028 B2 * | 3/2003 | von Hippel et al. | 423/376 |
| 6,537,506 B1 | 3/2003 | Schwalbe | |
| 6,541,676 B1 | 4/2003 | Franz | |
| 6,877,892 B2 | 4/2005 | Karp | |
| 6,890,093 B2 | 5/2005 | Karp | |
| 6,932,951 B1 * | 8/2005 | Losey et al. | 422/211 |
| 6,969,505 B2 * | 11/2005 | Tonkovich et al. | 423/648.1 |

(Continued)

OTHER PUBLICATIONS

Ahluwalia, et al., "Performance of CO Preferential Oxidation Reactor with Noble-Metal Catalyst Coated on Ceramic Monolith for On-Board Fuel Processing Applications", *Catal. Today*, 99(3-4), pp. 271-283 (2005).

(Continued)

*Primary Examiner* — Wayne Langel
(74) *Attorney, Agent, or Firm* — McCarter & English, LLP

(57) ABSTRACT

The present disclosure provides for a chemical reactor which includes elongate chambers defining an arrangement and including first, second, and third elongate chambers adapted to support respective distinct first, second, and third reactor functions associated with respective first, second, and third process feeds, and a distributor arranged in fluidic communication with each of the elongate chambers and for connecting the elongate chambers to at least one fluid source. The distributor is dimensioned to produce a two-dimensional radial distribution of fluidic flow through the first, second, and third elongate chambers with respect to the first, second, and third process feeds. The chemical reactor may further include a monolith catalyst support including an N×M array of channels including the elongated chambers. The elongate chambers and the distributor may manifest an interchangeable cartridge-based system wherein the arrangement of the elongate chambers is selectably detachable from the distributor and replaceable.

21 Claims, 21 Drawing Sheets

U.S. PATENT DOCUMENTS

| | | | |
|---|---|---|---|
| 7,056,477 | B1 | 6/2006 | Scwalbe |
| 7,141,530 | B2 | 11/2006 | Dullian |
| 7,241,423 | B2 | 7/2007 | Golbig |
| 2003/0100448 | A1 | 5/2003 | Cutler |
| 2005/0009175 | A1 | 1/2005 | Bergh |
| 2006/0153751 | A1 | 7/2006 | Tonkovich |
| 2006/0275185 | A1 | 12/2006 | Tonkovich |

OTHER PUBLICATIONS

Boger, et al., "Monolithic Catalysts for the Chemical Industry," *Ind. Eng. Chem. Res.*, 43(16), 4602-4611 (2004).

Commenge, et al., "Optimal Design for Flow Uniformaity in Microchannel Reactors," *AIChE Journal*, 48(2), 345-358 (2002).

Delsman, et al., "Experiments and Modeling of an Integrated Preferential Oxidation-Heat Exchanger Microdevice," *Chem. Eng. J.*, 101(1-3), 123-131 (2004).

Frauhammer, et al., "A New Reactor Concept for Endothermic High-Temperature Reactions," *Chem. Eng. Sci.*, 54(15-16), 3661-3670 (1999).

Frauhammer, et al., "Flow Distribution Concepts for New Type Monolithic Co- or Countercurrent Reactors," *Chem. Eng. Technol.*, 22(12), 1012-1016 (1999).

Herskowitz, et al., "Liquid Distribution in Trickle-Bed Reactors, Part I: Flow Measurements," *AIChE Journal*, 24, 439 (1978).

Holladay, et al., "Review of Developments in Portable Hydrogen Prodiuction Using Microreactor Technology," *Chem. Rev.*, '104(10), 4767-4790 (2004).

Kolios, et al., "Heat-Integrated Reactor Concepts for Hydrogen Production by Methane Steam Reforming," *Fuel Cells*, 5(1), 52-65 (2005).

Losey, et al.,"Design and Fabrication of Microfluidic Devices for Multiphase Mixing and Reaction," *J. Microelectromech. Syst.*, 11(6), 709-717 (2002).

Mirza, et al., "Silicon Wafer Bonding for MEMS Manufacturing," *Solid State Technol.*, 42(8), 73-78 (1999).

Peterson, "Numerical Modeling of Conduction Effects in Microscale Counterflow Heat Exchangers," *Microscale Thermophysical Engineering*, 3, 17-30 (1999).

Ramaswamy, et al., "Recuperative Coupling of Exothermic and Endothermic Reactions," *Chem. Eng. Sci.*, 61(2), 459-472 (2006).

Rebrov, et al., "Optimization of Heat Transfer Characteristics, Flow Distribution, and Reaction Processing for a Microstructured Reactor/Heat-Exchanger for Optimal Performance in Platinum Catalyzed Ammonia Oxidation," *Chem. Eng. J.*, 93(3), 201-216 (2003).

Schubert, et al., "Microstructure Devices for Applications in Thermal and Chemical Process Engineering," *Microscale Thermophysical Engineering*, 5, 17-39 (2001).

Stief, et al., "Numerical Investigations of Optimal Heat Conductivity in Micro Heat Exchangers," *Chem. Eng. Technol.*, 21(4), 297-303 (1999).

Tonkovich, A., et al., "Microchannel Technology Scale-Up to Commercial Capacity," *Chem. Eng. Res. Des.*, 83(A6), 634-639 (2005).

Wada, Y., et al., "Flow Distribution and Ozonolysis in Gas-Liquid Multichannel Microreactors," *Ind. Eng. Chem. Res.*, 45, 8036-8042 (2006).

\* cited by examiner

FIG. 1 (Prior Art)
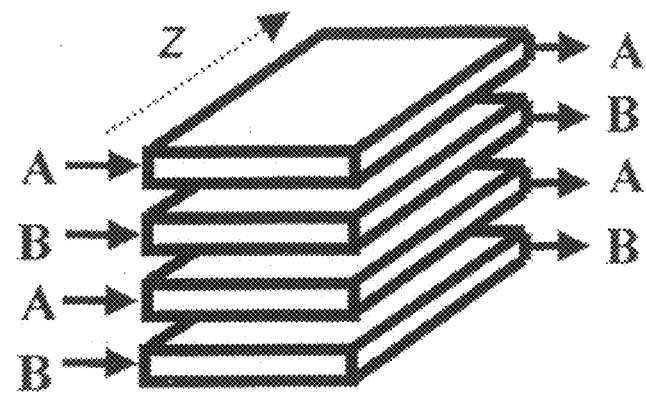
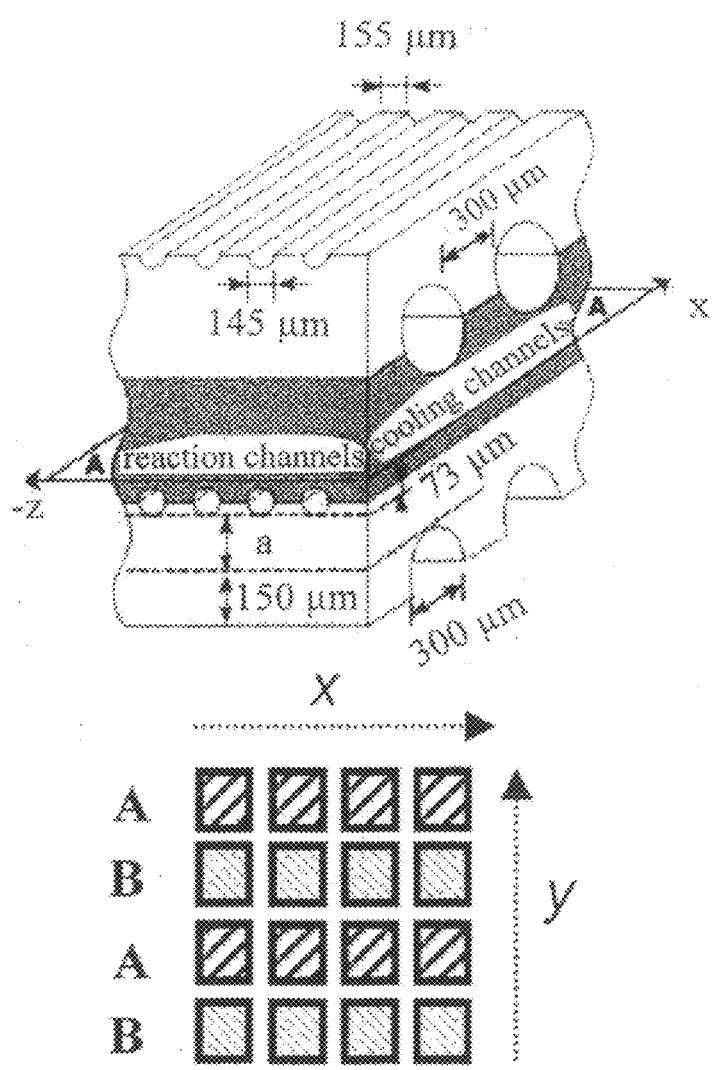

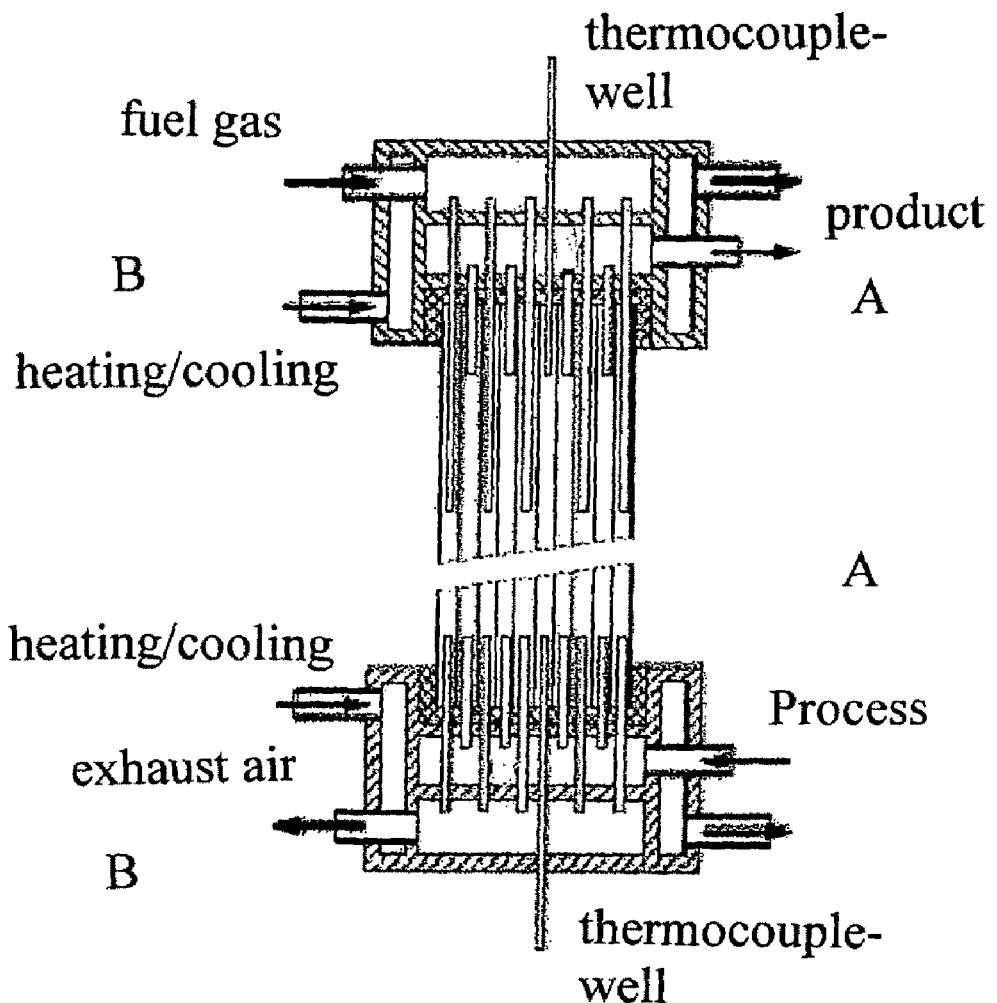
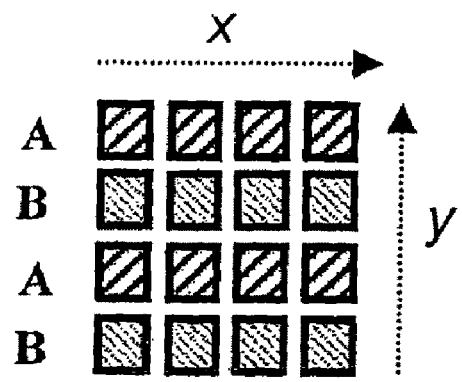
FIG. 3 (Prior Art)

FIG. 4
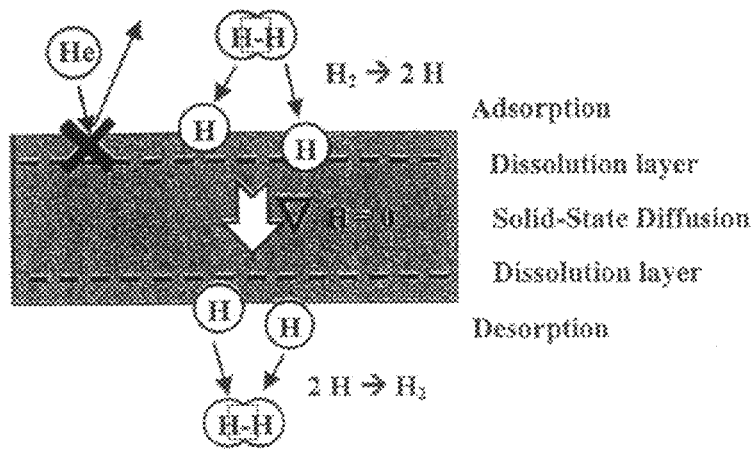
FIG. 5: (Prior Art)
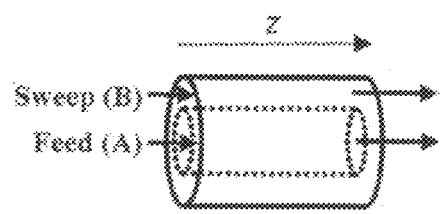
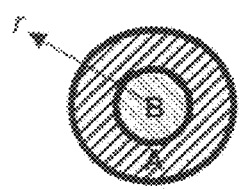
One-dimensional
radial distribution of
two fluid flows

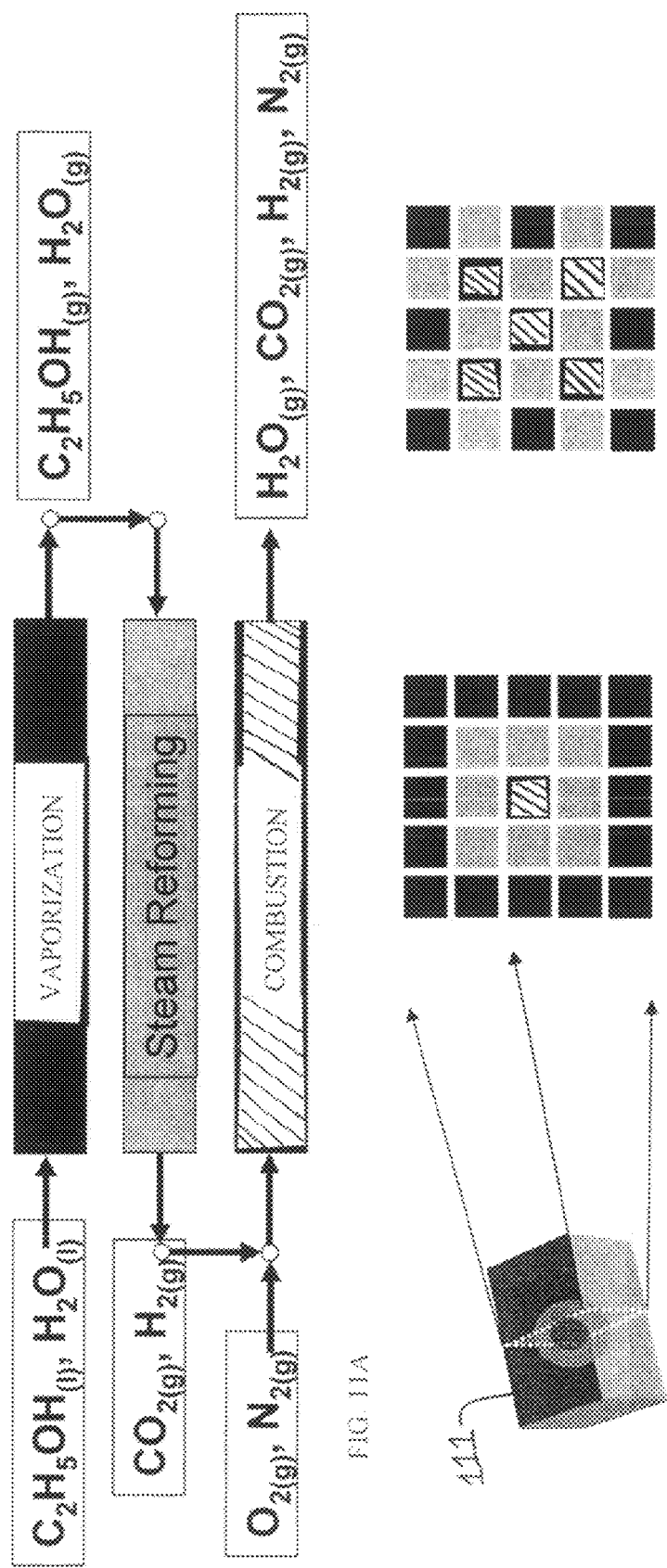

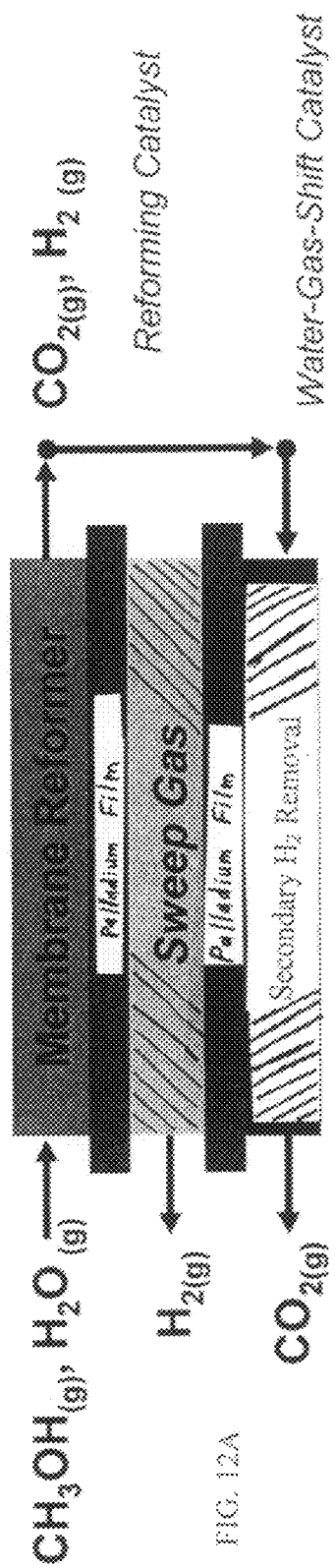
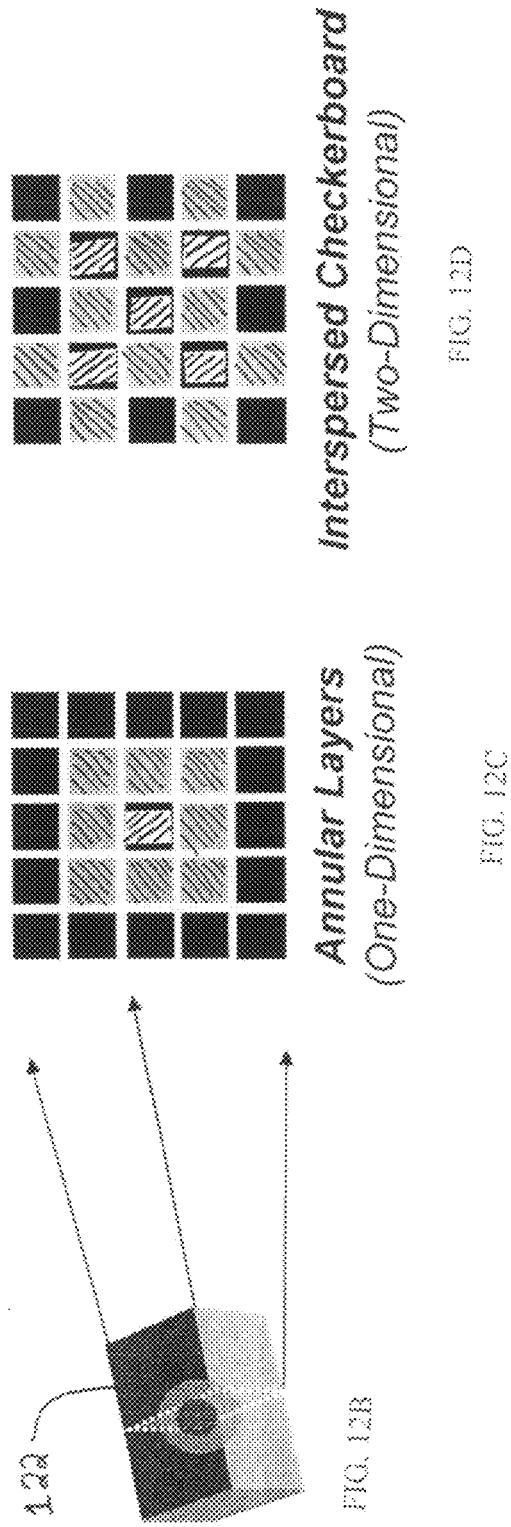

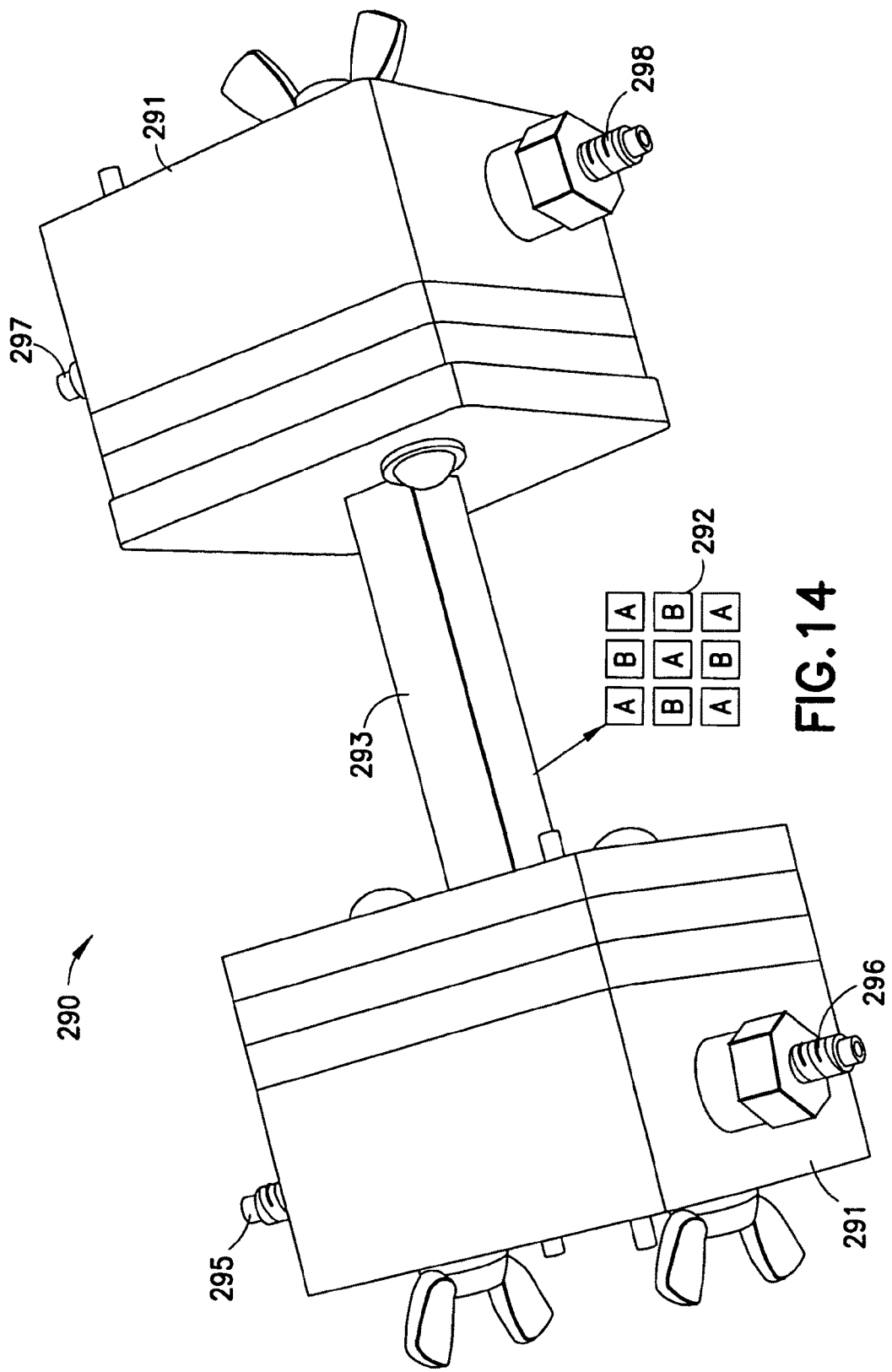

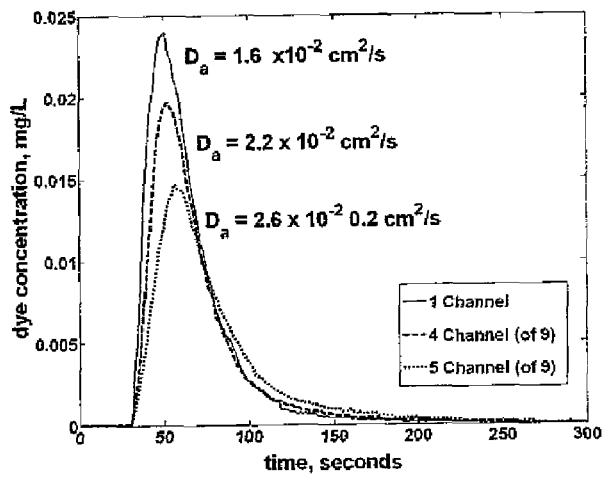

Figure 15 Residence-time distribution results for single-channel and for each fluid network in the proof-of-concept minichannel network. All data obtained for constant flowrate of 0.4 ml/min.

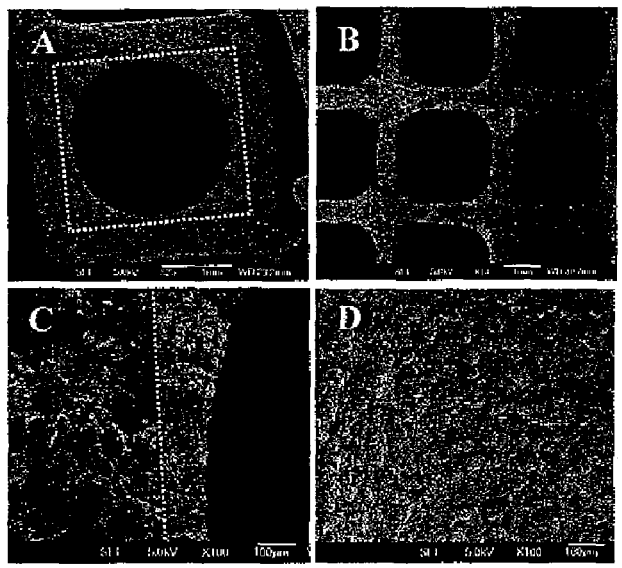

Figure 16: SEM images of alumina washcoatings applied to the ceramic monolith support; (a) single-channel coating, (b) nine-channel coating, (c) close-up cross-section and (d) top-down view of single-channel Two-dimensional radial distribution of unlimited flows FIG. 17A and 17B: Exemplary systems capable of combining at least three or more unique process channels in series or parallel with complex distribution pattern

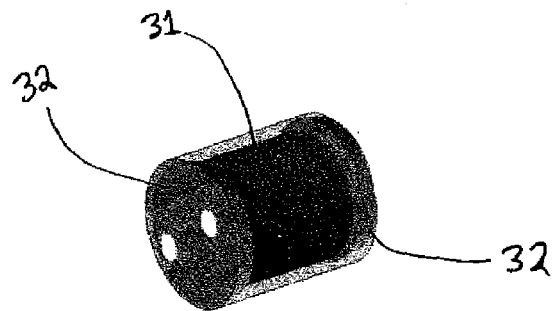
FIG. 18 : Assembled view of microchannel network employing Si-MEMS fabricated distributors
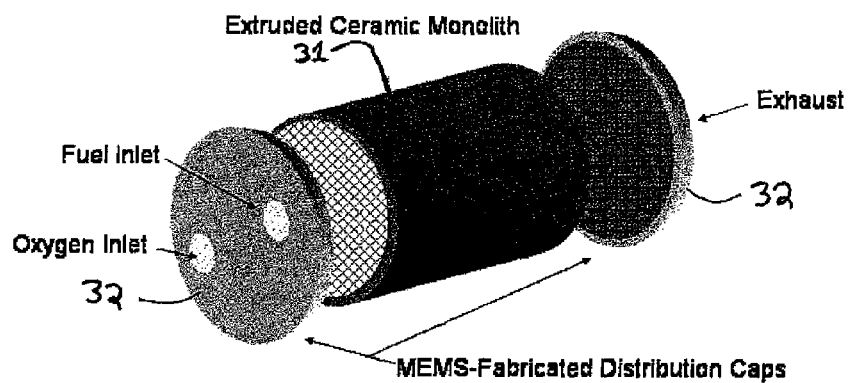
FIG. 19 : Exploded assembly view of microchannel network employing Si-MEMS fabricated distributors

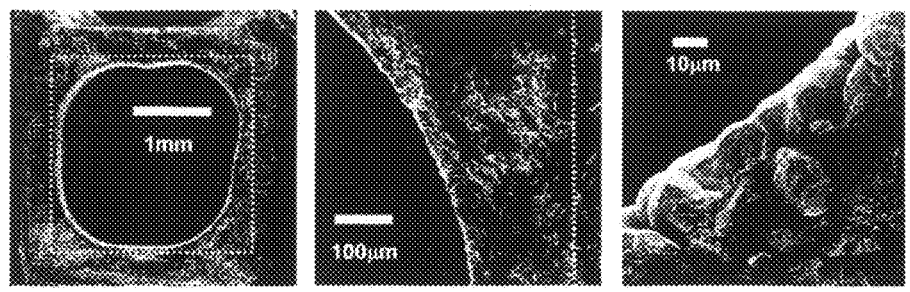
FIG. 20
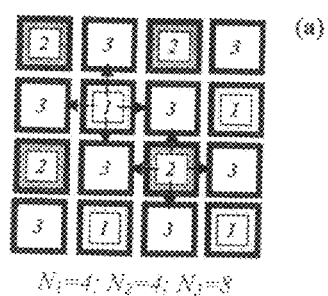
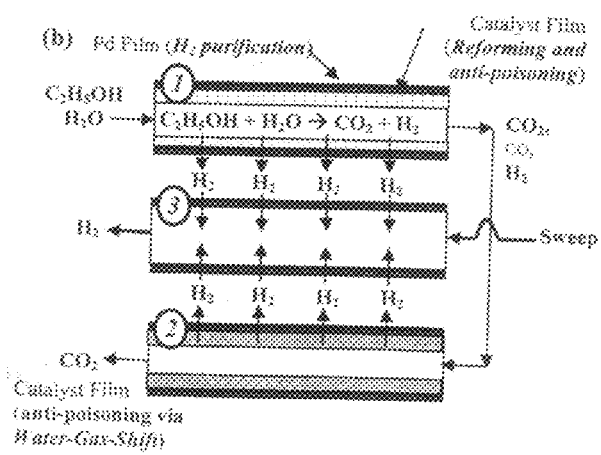
FIG. 21

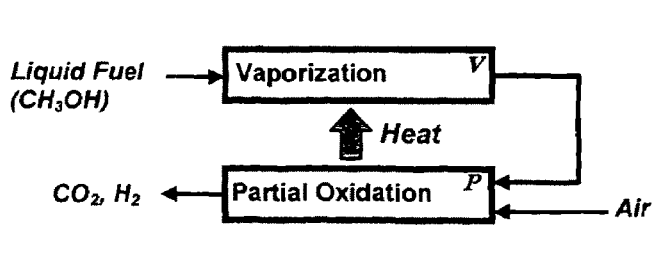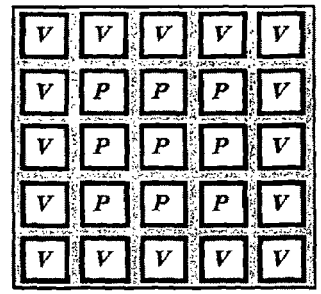
FIG. 26
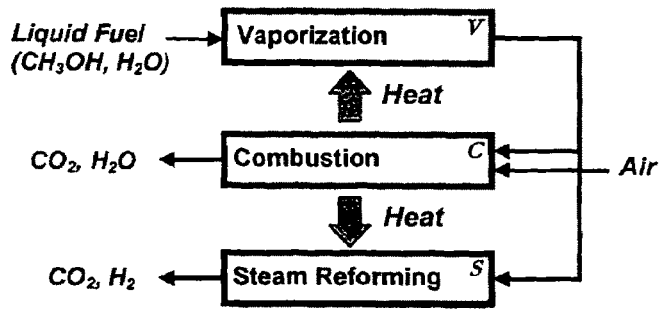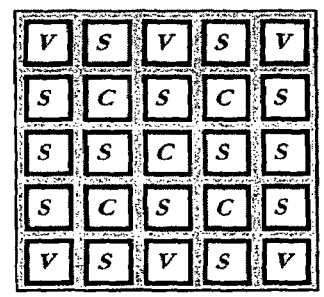
FIG. 27
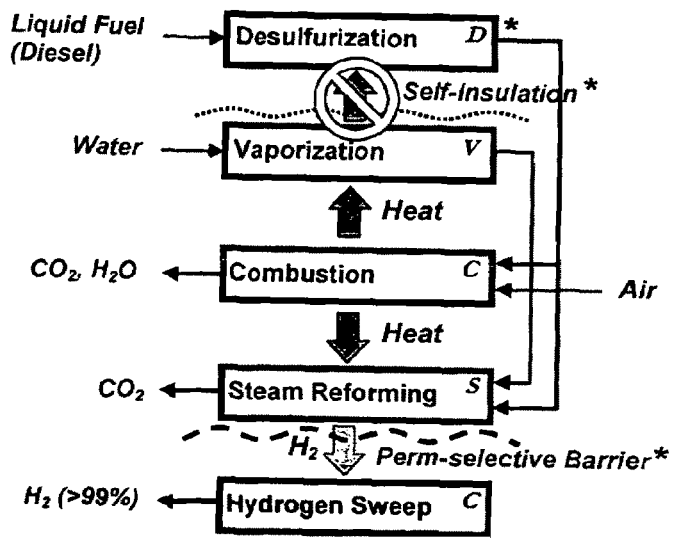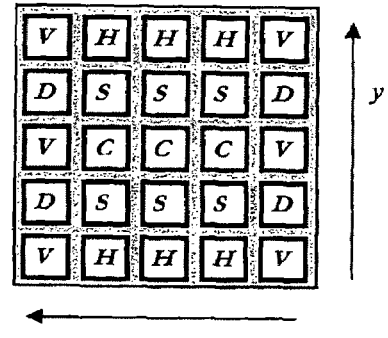
FIG. 28

PROCESS INTENSIFICATION IN MICROREACTORS

RELATED FEDERALLY SPONSORED RESEARCH

The work described in this patent disclosure was sponsored by the following federal agencies: National Science Foundation (NSF) Award/Grant No. 0730820 and Office of Naval Research (Young Investigator Program) Award/Grant No. N000140710828.

BACKGROUND

1. Technical Field

The present disclosure is directed to devices, systems and methods for catalyzing chemical reactions. More particularly, the present disclosure is directed to devices, systems, and methods for catalyzing chemical reactions via the use of dedicated reactors and/or micro-chemical systems.

2. Background Art

In general, fuel cell systems (e.g., systems employing electrochemical combustion of hydrogen gas) promise high-power, high-efficiency systems for meeting future propulsion and energy needs. For example, by utilizing electrochemical combustion of hydrogen gas, these systems generally overcome Carnot-cycle efficiency losses inherent to conventional direct-combustion engines. However, efficient, portable, and robust conversion of fuels (e.g., liquid fuels, diesel fuels, logistics fuels, naval logistics fuels, etc.) to hydrogen for subsequent electrochemical conversion remains an important challenge to realizing next-generation fuel cell energy systems.

In general, micro-chemical systems have been demonstrated as a promising technology for chemical processing, typically offering improved heat and mass transport owing to reduced characteristic lengths in mini- or micro-channels, and typically resulting in enhanced control of reaction temperature and hot-spot formation. Such systems have already been investigated as tools for: i) organic synthesis (see, e.g., De Mas, N., A. Gunther, T. Kraus, M. A. Schmidt and K. F. Jensen, *"Scaled-Out Multilayer Gas—Liquid Microreactor with Integrated Velocimetry Sensors," Ind. Eng. Chem. Res.,* 44(24), 8997-9013 (2005); Haswell, S. J., R. J. Middleton, B. O'Sullivan, V. Skelton, P. Watts and P. Styring, *"The Application of Micro Reactors to Synthetic Chemistry," Chem. Commun.,* (5), 391-398 (2001); DeWitt, S. H., *"Microreactors for Chemical Synthesis," Curr. Opin. Chem. Biol.,* 3(3), 350-356 (1999)); ii) high-energy laser chemistry (see, e.g., Wilhite, B. A., C. Livermore, Y. Gong, A. Epstein and K. F. Jensen, *"Design of a MEMS-Based Chemical Oxygen-Iodine Laser (COIL) System," IEEE J. of Quantum. Electron.,* 40, 1041 (2004a); Hill, T., L. Velasquez-Garcia, B. Wilhite, A. Epstein, K. Jensen and C. Livermore, *"A MEMS Singlet-Oxygen Generator," Hilton Head 2006: A Solid State Sensor, Actuator and Microsystems Workshop* (2006)); and iii) high-temperature fuel reforming (see, e.g., Wilhite, B. A., S. E. Weiss, J. Y. Ying, M. A. Schmidt and K. F. Jensen, *"Demonstration of 23 wt % Ag—Pd Micromembrane Employing 8:1 LaNi0.95Co$_0$.$_5$O$_3$/Al$_2$O$_3$ Catalyst for High-Purity Hydrogen Generation," Advanced Materials,* 18, 1701 (2006); Holladay, J. D., Y. Wang and E. Jones, *"Review of Developments in Portable Hydrogen Production Using Microreactor Technology," Chem. Rev.,* 104(10), 4767-4790 (2004)).

Enhanced heat and mass transport within mini- or micro-channels has fueled significant research towards developing heat-integrated micro-chemical systems. Mini- or micro-channel networks demonstrating simple distribution schemes to combine: (i) catalytic combustion with endothermic reforming (see, e.g., Arana, L. R., S. B. Schaevitz, A. J. Franz, M. A. Schmidt and K. F. Jensen, *"A Microfabricated Suspended-Tube Chemical Reactor for Thermally Efficient Fuel Processing," J. Microelectromech. Syst.,* 12(5), 600-612 (2003)); (ii) combustion and vaporization (see, e.g., Tonkovich, A. I. Y., D. M. Jimenez, J. L. Zilka, M. J. LaMont, Y. Wang, R. S. Wegeng, *"Microchannel Chemical Reactors for Fuel Processing," Proceedings of the 2$^{nd}$ International Conference on Microreaction Technology,* AIChE, New York, 186-195 (1998)); and (iii) combustion, reforming and vaporization (see, e.g., Pan, L. and S. Wang, *"Methanol Steam Reforming in a Compact Plate—Fin Reformer for Fuel-Cell Systems," Int. J. Hydrogen Energy,* 30(9), 973-979 (2005)) have already been reported. Additionally, work coupling fuel reforming with hydrogen production has been reported (see, e.g., Wilhite, B. A., S. E. Weiss, J. Y. Ying, M. A. Schmidt and K. F. Jensen, *"Demonstration of 23 wt % Ag—Pd Micromembrane Employing 8:1 LaNi0.95CO$_0$.$_5$O$_3$/Al$_2$O$_3$ Catalyst for High-Purity Hydrogen Generation," Advanced Materials,* 18, 1701 (2006); Deshpande, K. T., B. A. Wilhite, M. A. Schmidt and K. F. Jensen, *"Integrated Partial Oxidation and Purification Microsystems for Autothermal Production of Hydrogen from Methanol,"* presented at 2005 AIChE Annual Meeting, Cincinnati, Ohio, 36a (2005)). Existing mini- or micro-channel configurations typically consist of alternating plates, each such plate generally featuring a one-dimensional array of geometrically similar channels.

In general, current micro-fabrication methods can limit the potential for heat integration and process intensification. Mini- or micro-channel systems detailed in the literature are typically constructed from patterns micro-machined in materials such as, for example, stainless steel, glass, and/or Si-based materials, and typically include multiple parallel channels (e.g., up to a 1×M array) within a single flat plate, as illustrated in FIG. 1 (see, e.g., Commenge, J. M., L. Falk, J. P. Corriou and M. Matlosz, *"Optimal Design for Flow Uniformity in Microchannel Reactors," AIChE Journal,* 48(2), 345-358 (2002); Delsman, E. R., M. H. J. M. deCroon, G. J. Kramer, P. D. Cobden, Ch. Hofmann, V. Cominos and J. C. Schouten, *"Experiments and Modeling of an Integrated Preferential Oxidation-Heat Exchanger Microdevice," Chem. Eng. J.,* 101(1-3), 123-131 (2004)). In accordance with such methods, heat transport between separate process flows tends to take place along a single direction between the respective channels of vertically adjacent plates arranged in a stack. In addition, one-dimensional analysis demonstrates that the use of high thermal conductivity materials (e.g., silicon, stainless steel) in such applications can significantly limit the thermal efficiency of the necessary heat exchange owing to significant axial conduction losses (see, e.g., Stief, T., O.-U. Langer and K. Schubert, *"Numerical Investigations of Optimal Heat Conductivity in Micro Heat Exchangers," Chem. Eng. Technol.,* 21(4), 297-303 (1999); Peterson, R. B., *"Numerical Modeling of Conduction Effects in Microscale Counterflow Heat Exchangers," Microscale Thermophysical Engineering,* 3, 17-30 (1999)).

Referring now to FIG. 2, current methods for manufacturing mini- or micro-channel networks typically includes methods that employ concurrent micromachining of both distributors and mini- or micro-channels. Individual flat plates are machined with patterns to create rows of mini- or micro-channels addressed by a cross-sectional slice of the distributor. Stacking and sealing of individual plates allows creation of large, two-dimensional arrays of mini- or micro-channels, addressed by simple fluid distributors. Multiple process flows can be distributed amongst the mini- or micro-channels of the array in alternating planes, creating simple distribution patterns. The cost of system scale-up is typically linear, as more plates are required for more channels to accommodate more or different process flows. As practical experience dictates that stacking of more than ten (10) plates is impractical, such systems typically manifest a limited scale.

As such, micro-chemical systems have typically been limited to alternating plate designs manifesting one-dimensional radial distribution patterns of fluidic flow. In addition, the industrial applicability of such systems is further limited by the low mechanical strength and high cost of micromachining individual porous membrane supports.

Thus, despite efforts to date, a need remains for enhanced reactor designs, reactor systems, and associated methodologies. These and other inefficiencies and opportunities for improvement are addressed and/or overcome by the systems and methods of the present disclosure.

SUMMARY

The present disclosure provides for improved devices, systems and methods for catalyzing chemical reactions. More particularly, the present disclosure provides for improved devices, systems, and methods for catalyzing chemical reactions via the use of dedicated reactors and/or micro-chemical systems.

The present disclosure also provides for a chemical reactor, including a plurality of elongate reaction chambers defining an arrangement, the elongate reaction chambers of the plurality thereof including at least a first elongate chamber adapted to support a first reactor function occurring therewithin associated with a first process feed, a second elongate chamber adapted to support a second reactor function occurring therewithin associated with a second process feed, and a third elongate chamber adapted to support a third reactor function occurring therewithin associated with a third process feed, each of the first, second, and third reactor functions being distinct from each other of the first, second, and third reactor functions; and a distributor arranged in fluidic communication with each of the elongate chambers of the plurality thereof, the distributor configured and dimensioned to distribute at least one fluid to each elongate chamber and to produce a two-dimensional radial distribution of fluidic flow through at least the first, second, and third elongate chambers with respect to the first, second, and third process feeds.

The present disclosure also provides for a chemical reactor, further including a bundle of extruded channels, wherein the bundle of extruded channels at least include the elongate chambers of the plurality thereof. The present disclosure also provides for a chemical reactor further including a monolith catalyst support including an N×M array of channels, wherein the channels of the N×M array thereof at least include the elongate chambers of the plurality thereof. The present disclosure also provides for a chemical reactor wherein at least one of the elongate chambers of the plurality thereof is defined by walls formed from at least one selected from the group consisting of cordierite ($2MgO-2Al_2O_3-5SiO_2$), mullite ($3Al_2O_3-2SiO_2$), alumina ($Al_2O_3$), activated carbon, and copper.

The present disclosure also provides for a chemical reactor wherein at least one of the elongate chambers of the plurality thereof is defined by walls including a microporous material layer for introducing catalytic activity. The present disclosure also provides for a chemical reactor wherein the microporous material layer is formed via at least one selected from a group comprising washcoating and impregnation. The present disclosure also provides for a chemical reactor wherein at least one of the elongate chambers of the plurality thereof is defined by walls including a perm-selected film for hydrogen purification. The present disclosure also provides for a chemical reactor wherein at least one of the elongate chambers of the plurality thereof manifests a membrane reaction configuration for combining hydrogen generation with purification.

The present disclosure also provides for a chemical reactor wherein the distributor is further configured and dimensioned to receive an input fluid and discharge substantially pure hydrogen and substantially pure carbon dioxide. The present disclosure also provides for a chemical reactor wherein the input fluid is a fuel or bio-fuel. The present disclosure also provides for a chemical reactor wherein the elongate chambers of the plurality thereof and the distributor are configured and dimensioned to perform an integrated, multi-stage process of hydrogen extraction.

The present disclosure also provides for a chemical reactor wherein at least some of the elongate chambers of the plurality thereof manifest a ceramic mini- or micro-channel network. The present disclosure also provides for a chemical reactor wherein the network further includes composite catalyst membranes for hydrogen coupling of alcohols. The present disclosure also provides for a chemical reactor wherein the plurality of elongate chambers are extruded mini-channels or micro-channels. The present disclosure also provides for a chemical reactor wherein at least some of the elongate chambers of the plurality thereof manifest a coupling of catalytic reforming membranes with non-catalytic gas cleanup membranes.

The present disclosure also provides for a chemical reactor wherein the elongate chambers of the plurality thereof manifest a complex flow distribution scheme for at least one of: i) combining catalytic combustion with endothermic reforming, ii) combining combustion with vaporization, iii) combining combustion, reforming, and vaporization, and iv) coupling fuel reforming with hydrogen production. The present disclosure also provides for a chemical reactor wherein the plurality of elongate chambers and the distributor manifest an interchangeable cartridge-based system wherein the arrangement of the elongate chambers of the plurality thereof is selectably detachable from the distributor and selectably replaceable with another arrangement of elongate chambers. The present disclosure also provides for a chemical reactor wherein the distributor is fabricated via at least one process selected from a group comprising machining, micromachining, microelectromechanical systems (MEMS) photolithography and chemical etching techniques, and fusion bonding of separately machined plates.

The present disclosure also provides for a chemical reactor wherein the distributor includes respective first and second flow distribution heads having respective ends coupled to opposite corresponding ends of the arrangement and respectively arranged in fluidic communication with each of the elongate chambers of the plurality, each of the first and second flow distribution heads being fluidically sealed with respect to the respective corresponding end of the arrangement. The present disclosure also provides for a chemical reactor wherein each flow distribution head is sealed via at least one sealing material for enabling effective sealing at temperatures less than about 250° C. The present disclosure also provides for a chemical reactor wherein the first process feed is a reforming feed, the second process feed is a gas cleanup feed, and the third process feed is a sweep feed; and further including a first fluidic reservoir arranged in fluidic communication with the distributor for providing a reactant fluid associated with the first and second feeds, and a second fluidic reservoir arranged in fluidic communication with the distributor for providing a fluid associated with the third feed.

The present disclosure also provides for a method of extracting hydrogen from a fuel, including providing a chemical reactor comprising a plurality of elongate chambers defining an arrangement, the elongate chambers of the plurality thereof including at least a first elongate chamber adapted to support a first reactor function occurring therewithin associated with a first process feed, a second elongate chamber adapted to support a second reactor function occurring therewithin associated with a second process feed, and a third elongate chamber adapted to support a third reactor function occurring therewithin associated with a third process feed, each of the first, second, and third reactor functions being distinct from each other of the first, second, and third reactor functions; connecting a first fluidic reservoir containing a fuel associated with the first and second process feeds to the elongate chambers of the plurality thereof; connecting a second fluidic reservoir containing a sweep fluid associated with the third process feed to the elongate chambers of the plurality thereof; and operating the chemical reactor to produce a two-dimensional radial distribution of fluidic flow through the first, second, and third elongate chambers with respect to the first, second, and third process feeds for extracting a quantity of hydrogen from a reforming feed, the reforming feed being one of the first and second process feeds, and introducing a quantity of hydrogen into the sweep feed.

The present disclosure also provides for a method of extracting hydrogen from a fuel, wherein the step of operating the chemical reactor to produce the two-dimensional radial distribution of fluidic flow through the first, second, and third elongate chambers with respect to the first, second, and third process feeds is further for extracting a quantity of hydrogen from a gas cleanup feed, the gas cleanup feed being the other one of the first and second process feeds, and increasing a purity of a carbon dioxide effluent associated with the gas cleanup feed.

Additional advantageous features, functions and applications of the disclosed systems and methods of the present disclosure will be apparent from the description which follows, particularly when read in conjunction with the appended figures.

BRIEF DESCRIPTION OF THE FIGURES

To assist those of ordinary skill in the art in making and using the disclosed systems and methods, reference is made to the appended figures, wherein:

FIG. 1 illustrates a conventional stack of micro-machined cross-flow or parallel-flow plates having multiple parallel channels for producing a one-dimensional radial distribution of two fluid flows;

FIG. 3 illustrates conventionally machined distributors coupled to a monolithic catalyst exhibiting one-dimensional radial distribution of two fluid flows;

FIG. 4 illustrates a mechanism of selective hydrogen transport through dense palladium films;

FIG. 5 illustrates tubular membrane cartridges comprising a conventional method for coupling two parallel flows using a one-dimensional radial distribution of the two fluid flows;

FIGS. 11A-11D illustrate an exemplary system and related method in accordance with the present disclosure providing process integration of three processes and improved heat transfer;

FIGS. 12A-12D illustrate an exemplary system and related method in accordance with the present disclosure providing process integration of three processes and improved mass transfer;

FIG. 14 is a depiction of an exemplary mini-channel device or reactor in accordance with the present disclosure incorporating a 9-channel network or monolith and two (2) distributor heads of a distributor, and associated with a two-dimensional radial distribution of two separate flows;

FIG. 15 depicts residence time distribution data corresponding to the mini- or micro-channel of FIG. 14;

FIG. 16 illustrates SEM microscopy images of alumina films on monolith supports in accordance with the present disclosure;

FIGS. 18 and 19 depict an exemplary micro-channel network or reactor employing Si-MEMS fabricated distributors in accordance with the present disclosure;

FIG. 20 depict scanning-electron images of baseline palladium permselective coatings produce via electroless plating on a single alumina washcoat layer in accordance with the present disclosure;

FIGS. 21A-B depict an exemplary system in accordance with the present disclosure for coupling three separate membrane process flows;

FIG. 26 schematically depicts an exemplary two-process heat integration of methanol vaporization and subsequent partial oxidative reforming in accordance with the present disclosure;

FIG. 27 schematically depicts an exemplary three-process heat integration of water-methanol vaporization, steam reforming and combustion in accordance with the present disclosure;

FIG. 28 depicts an exemplary process for diesel-to-hydrogen reforming utilizing hydrogen separation membranes and desulfurization in accordance with the present disclosure;

DETAILED DESCRIPTION

Figure 2:
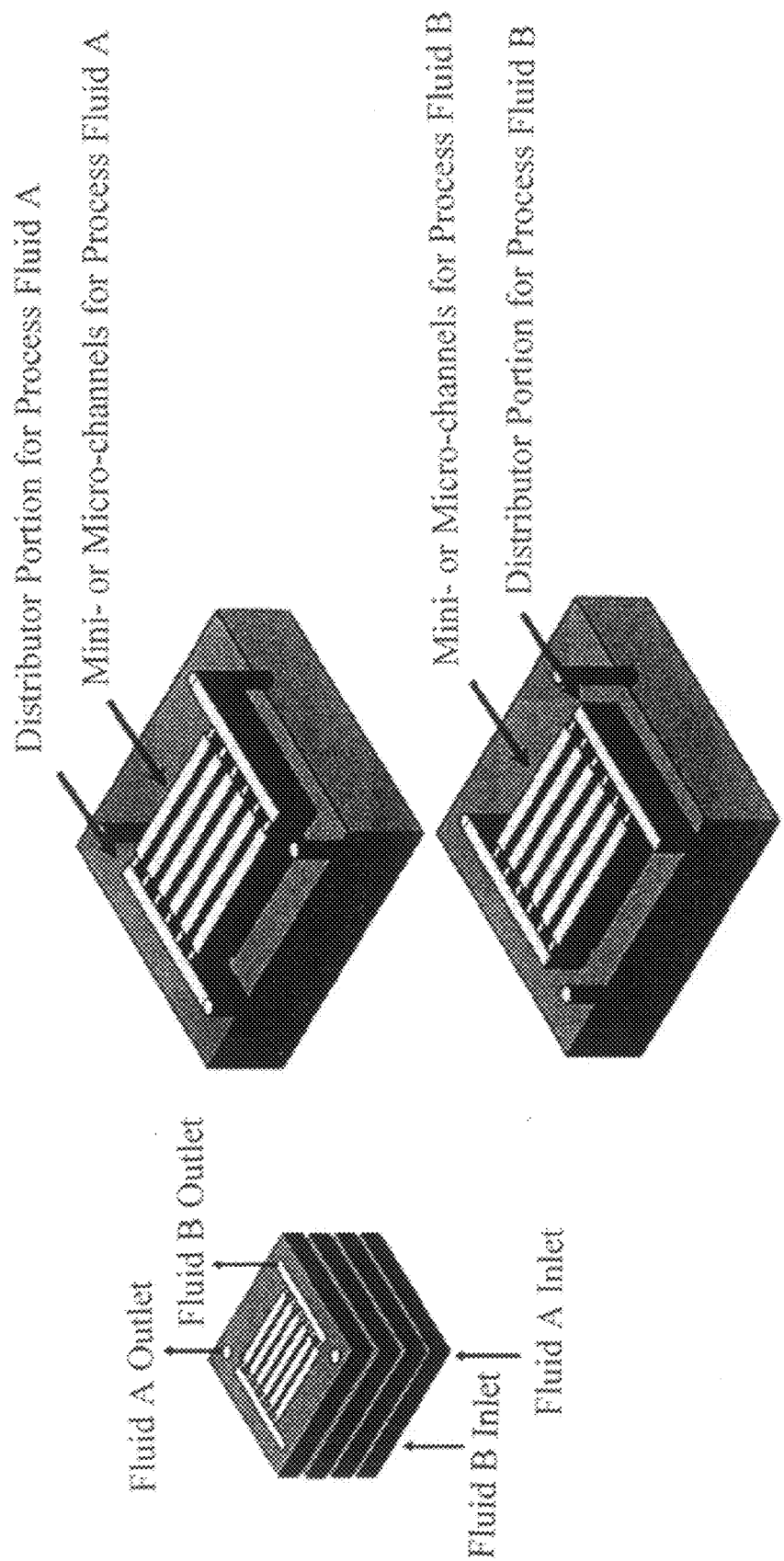
FIG. 2 illustrates current methods for manufacturing networks of mini- and micro-channels.

In accordance with exemplary embodiments of the present disclosure, a new class of mini- or micro-channel reactors is provided, combining benefits of (i) micromachining for realizing complex, two-dimensional radial distribution patterns for heat transfer and process intensification, (ii) extrusion for versatile fabrication of scalable mini- or micro-channel networks over a range of thermal, mechanical, and catalytic properties not currently achievable by current micro-reactor fabrication methods, and (iii) ease of catalyst introduction, via conventional methods (e.g., washcoating, impregnation, supercritical fluid deposition, etc.) already established for monolith catalyst supports or the like (e.g., straight channel and/or honeycomb monolith substrates or the like). A new class of chemical reactor or reforming unit is thus provided that is capable of coupling three or more separate kinetic and/or transport processes within a single unit or reactor (e.g., within a single cartridge-based unit or reactor). In exemplary embodiments, this provides a breakthrough in the design of portable reactors or fuel reformers capable of efficiently converting fuels (e.g., logistics fuels, diesel fuel, etc.) to hydrogen. Product hydrogen can then be employed by next generation electrochemical systems (e.g., fuel cell systems, electrochemical engine systems, etc.) at efficiencies significantly greater than conventional combustion engine systems.

In accordance with exemplary embodiments of the present disclosure, large networks of mini- or micro-channels can be manufactured separately from the distributors) via extrusion and/or ceramics processing (e.g., ceramics extrusion). For example, straight-channel monolith catalyst supports, occasionally referred to as 'honeycomb monoliths', provide an inexpensive, well understood means of constructing an N×M array of identical channels with fluidic diameters ranging from about 500 to about 5000 microns, wall thicknesses ranging from about 200 to about 2000 μm (see Table 1 below), and flow lengths ranging from millimeters to centimeters.

TABLE 1

Channel dimensions for various monolith cell densities, from Gulati, S. T., "Ceramic Catalyst Supports for Gasoline Fuel," Chapter 2, in Structured Catalysts and Reactors, Marcel Dekker Inc., New York, 1998

| Cells per in$^2$ (cpsi) | Wall thickness | Channel width |
|---|---|---|
| 25 | 0.89 mm | 4.2 mm |
| 100 | 0.38 mm | 2.2 mm |

TABLE 1-continued

Channel dimensions for various monolith cell densities, from Gulati, S. T., "Ceramic Catalyst Supports for Gasoline Fuel," Chapter 2, in Structured Catalysts and Reactors, Marcel Dekker Inc., New York, 1998

| Cells per in$^2$ (cpsi) | Wall thickness | Channel width |
|---|---|---|
| 200 | 0.27 mm | 1.5 mm |
| 300 | 0.20 mm | 1.2 mm |
| 600 | 0.10 mm | 0.93 mm |
| 900 | 0.05 mm | 0.80 mm |

Current industrial use of monolith catalyst technology typically involves the passing of a single process fluid over the entire network. Over time, however, there have been some attempts at employing distribution technology. For example, Minjolle (U.S. Pat. No. 4,271,110) patented a method for hand cutting each channel in an extruded ceramic honeycomb monolith to permit two distinct process flows to be distributed amongst the channels of the network.

As shown in FIG. 3, a distributor head, as described by Frauhammer, J., G. Friedrich, G. Kolios, T. Klingel, G. Eigenberger, L. Von Hippel, and D. Arntz, in "Flow Distribution Concepts for New Type Monolithic Co-or Countercurrent Reactors," Chem. Eng. Technol., 22(12), 1012-1016 (1999), has been used to address each channel of a ceramic honeycomb monolith with a connection to one or the other of two fluidic reservoirs, generating a two-dimensional radial distribution pattern of fluidic flow within the various channels of the network. This design, constructed using conventional plumbing techniques, generally follows established methods for distributor design and construction. Once again, design complexity is limited to two separate process flows, and the potential scale of the network is limited due to the requirement that each channel feed be assembled by hand.

Recently, a method of coupling steam reforming with combustion for adiabatic methane reforming using the Frauhammer et al. system was investigated, producing experimental results indicating that a localized hot-spot of about 1500° C. was maintained within a 100 cells-per-square inch (cpsi) α-Al$_2$O$_3$ monolith (see, e.g., Kolios, G., B. Glocker, A. Gritsch, A. Morillo and G. Eigenberger, "Heat-Integrated Reactor Concepts for Hydrogen Production by Methane Steam Reforming," Fuel Cells, 5(1), 52-65 (2005)). Notably, the method so investigated was reliant upon conventional distributor manufacturing methods, with the system complexity limited to two separate process flows, and the associated channels on the millimeter scale (e.g., greater than 1.5 mm) with respect to their individual diameters.

In general, honeycomb monolith structures can be formed at relatively low costs from porous ceramics such as, for example, cordierite (2MgO-2Al$_2$O$_3$-5SiO$_2$), mullite (3Al$_2$O3-2SiO$_2$), alumina (Al$_2$O$_3$), and activated carbon, and/or from high thermal conductivity materials such as, for example, copper or the like. Monolith catalyst technology allows for extrusion of large (e.g., about $10^1$ to about $10^4$) networks of parallel channels with selectable porosity (e.g., for gas purification), catalytic activity (e.g., for fuels reforming and other chemical applications), and/or thermal conductivity (e.g., for heat removal/addition). In general, catalytic activity may be introduced into individual channels by, for example, washcoating or impregnation. Monolith catalysts have been investigated for, inter alia, applications requiring high catalyst surface areas with low axial pressure drops, including selective catalytic reduction of NO$_x$, catalytic combustion, multiphase chemical reactors, and bioreactors. Additionally, honeycomb monoliths or the like have been identified as a potential technology for catalytic generation of hydrogen, via alcohol partial oxidation and autothermal reforming of gasoline.

In general, the practice of using palladium-based films for selective removal of hydrogen gas has been the subject of significant research over the past five decades (see, e.g., Paglieri, S. N. and J. D. Way, "*Innovations in Palladium Membrane Research*," Sep. Purif. Methods, 31(1), 1-169 (2002); Shu, J., B. P. A. Grandjean, A. van Neste and S. Kaliaguine, "*Catalytic Palladium-Based Membrane Reactors: A Review*," Can. J. Chem. Eng., 69(5), 1036-1060 (1991)). The dissociative adsorption of hydrogen on palladium surfaces, coupled with high hydrogen solubilities and the absence of native or surface oxide formation, generally enables a five-step mechanism limited solely to hydrogen transport through dense, pin-hole free films, as shown in FIG. 4. As depicted in FIG. 5, palladium membranes can be fashioned from rolled metal sheets into self-supported tubular films, or as thin coatings deposited on porous mechanical supports in either tubular or cross-flow plate configurations, as illustrated in FIG. 1. Coating methods include, without limitation, electroless plating, sputtering, metal evaporation and supercritical fluids processing. As illustrated in FIGS. 1, 3 and 5, these existing membrane systems are limited to mass transfer between two separate process flow volumes. Primary challenges to operation of palladium films are (i) carbon monoxide poisoning and/or (ii) corrosion via hydrocarbons, oxygen or sulfur. Currently, alloying of palladium with other transition metals, typically by addition of copper or silver, is employed to reduce susceptibility to corrosion and poisoning by sulfur, carbon monoxide, and other gases encountered in fuel reforming chemistries.

In general, palladium membranes may be combined with reforming catalysts in a "membrane reactor" packed-bed configuration. Combining reaction and separation in a single volume typically allows (i) reduced system complexity, and (ii) shifting of reaction equilibrium by hydrogen removal. Generally owing to the low rate of hydrogen permeation relative to catalytic generation, large membrane surface area-to-catalyst volume ratios are desirable.

Depending upon fuel source, for example, additional upstream desulfurization and/or denitrification stages may also be required. Reforming efficiency can be improved by combining several catalytic membrane units in series (e.g. steam reforming, water-gas-shift, preferential oxidation). Tube-and-shell or cross-flow membrane designs are generally not capable of combining multiple membrane processes within a single unit for efficient integrated extraction of hydrogen from complex fuels (e.g. ethanol, glycerol, biogas).

In general, hydrogen purification studies in micro-chemical systems have primarily focused upon employing palladium-based permselective films. Micro-membrane architectures employing porous silicon free-standing films supporting palladium and palladium alloys have been demonstrated by research groups for hydrogen purification, and for hydrogen generation coupled with purification.

The use of free-standing membranes fashioned from low-thermal conductivity materials, such as, for example, silicon oxide, silicon nitride, or a combination of both typically allows high-temperature operation of the membrane without suffering substantial heat losses to the surrounding silicon substrate. However, the mechanical stability of self-supporting, thermally isolated films is relatively low, limiting maximum pressure differentials for driving mass transfer across low-stress metal films, therefore providing significant challenges to fabricating mechanically stable, high-stress electro-ceramic films.

In general, corrosion of palladium-based hydrogen permselective films is a significant challenge for practical application in hydrogen extraction from biofuels. The chemical stability of palladium-based films typically can be increased by alloying (e.g., Cu—Ag alloys), often at the expense of hydrogen permeabilities. An alternative strategy involves the creation of a composite membrane comprised of a palladium permselective film and a porous, catalytic anti-corrosion coating, as disclosed in Wilhite, B. A., S. E. Weiss, J. Y. Ying, M. A. Schmidt and K. F. Jensen, "*Demonstration of 23 wt % Ag—Pd Micromembrane Employing 8:1 LaNi$0.95$Co$_0$.$_0$$_5$O$_3$/ Al$_2$O$_3$ Catalyst for High-Purity Hydrogen Generation*," Advanced Materials, 18, 1701 (2006); and Masel, R. I., "*Hydrogen Quick and Clean*," Nature, 442, 521-522 (2006), the entire contents of both being hereby incorporated by reference in their entireties. In general, the catalytic washcoat of this strategy converts corrosives and poisons into hydrogen and/or inert species before they can reach the palladium surface. For example, the presence of a catalytic reforming layer (e.g., 8:1 $LaNi_{0.95}Co_{0.05}O_3:Al_2O_3$ slurry-coat, about 200 µm thick) substantially prevents corrosion and reduces CO poisoning of the palladium film by about 90%. The resulting composite catalytic hydrogen extraction membrane may be capable of steady hydrogen extraction from methanol over a range of oxygen-to-fuel ratios with minimal CO poisoning and no measurable film corrosion or degradation.

Turning now to the distribution of fluidic flow in accordance with exemplary embodiments of the present disclosure, precision machining allows fabrication of complex flow distribution patterns with mini- to micro-scale features. In accordance with exemplary embodiments of the present disclosure, such patterns and features may be incorporated into distribution caps, heads, plates and/or distributors sealed directly to the network of mini- or micro-channels (e.g., to the monolith face), efficiently and effectively addressing process flows into and out of each individual channel. Uniform fluid delivery to individual mini- or micro-channels may be ensured via inclusion of microfabricated constrictions in the distributor. By packaging the network of channels (e.g., the monolith) along with such channel-specific distributors in accordance with the present disclosure, two-dimensional networks of channels supporting multiple (e.g., at least three or more) separate and distinct process flows in a variety (e.g., one-dimensional, two dimensional) of radial distribution patterns of fluidic flow are realized, providing a variety of advantages, such as, for example, efficient heat transfer over a range of materials properties, as shown in Table 2.

In accordance with exemplary embodiments of the present disclosure, fluid distributors may be fabricated using, for example, microelectromechanical systems (MEMS) photolithography and/or chemical etching techniques, and such techniques may be employed to couple three or more process flows and/or flow-folding for entropy-box designs. Thus, apparatus, systems and methods are provided in accordance with the present disclosure that realize improved flow complexity and thermal efficiency.

TABLE 2

Comparison of materials properties achievable via the disclosed technique with existing microchemical systems.

| Material | Density (gm/cc) | Thermal Conductivity (W/m·K) | Coefficient of Thermal Expansion (°C.$^{-1}$) | Melting Point (°C.) | |
|---|---|---|---|---|---|
| Cordierite | 2.6 | 2.5 | $2.2 \times 10^{-6}$ | 1370 | Extrusion |
| Alumina | 3.8 | 25 | $8.4 \times 10^{-6}$ | 2000 | Micro- |
| Copper | 8.9 | 380 | $1.7 \times 10^{-5}$ | 1080 | machining |
| S.S. 316L | 8.0 | 20 | $2.0 \times 10^{-5}$ | 1370 | |
| Silicon | 2.3 | 150 | $8.2 \times 10^{-4}$ | 1380 | |
| SiO$_2$ (Fused Quartz) | 2.2 | 1.4 | $4.5 \times 10^{-7}$ | 1680 | |
| Pyrex 7740 | 2.2 | 1.1 | $3.3 \times 10^{-6}$ | 1250 | |

Figure 6:
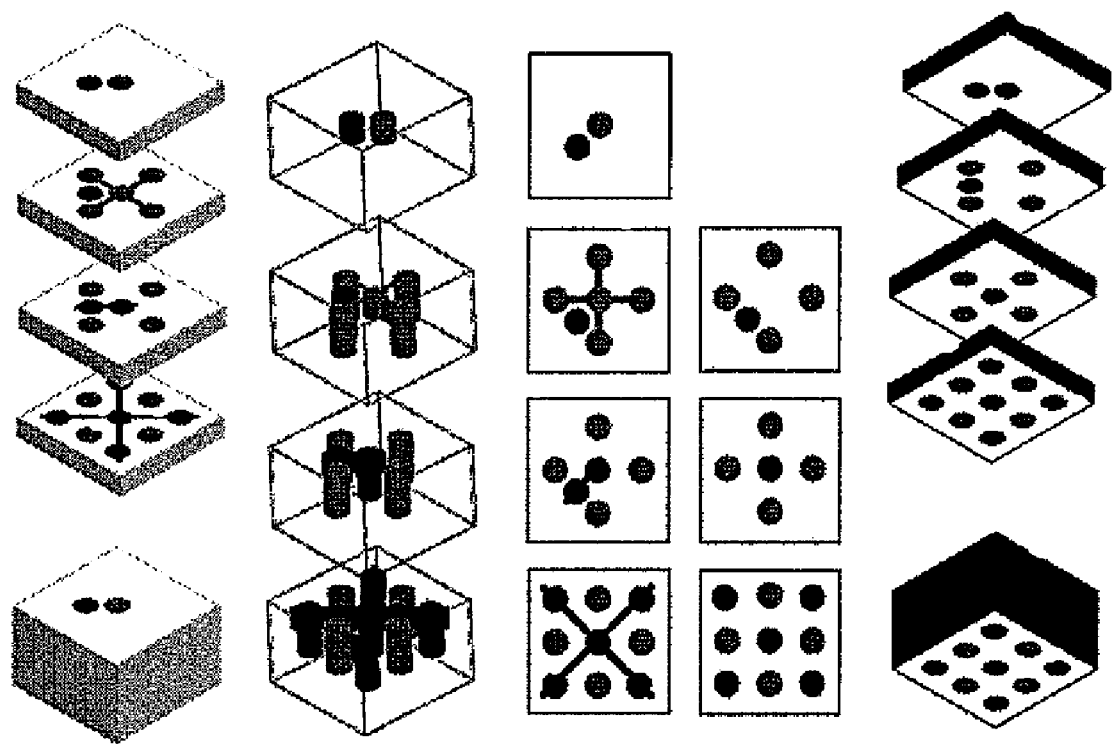
FIG. 6 is a schematic representation of an exemplary assembled distributor for distributing two fluids amongst a 3×3 micro-channel array in accordance with the present disclosure.

In an exemplary embodiment, a detailed schematic of a nine-channel distributor design in accordance with the present disclosure is shown in FIG. 6. FIG. 6 depicts a schematic of a distributor for distributing two fluids amongst a 3×3 (9 total) mini- or micro-channel array for heat integration.

Figure 7:
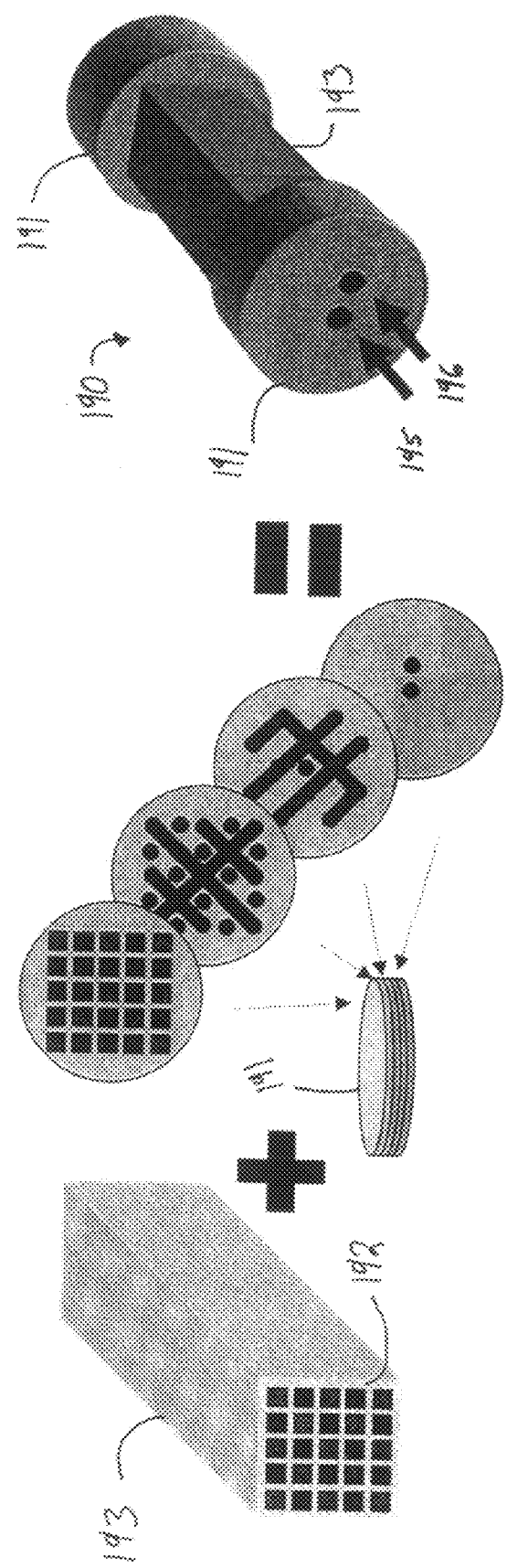
FIG. 7 is a detailed schematic of an exemplary twenty-five channel distributor design in accordance with the present disclosure.

In another embodiment, a detailed schematic of a twenty-five channel distributor design in accordance with the present disclosure is presented in FIG. 7. FIG. 7 illustrates that, in regards to distribution, it is desirable to have unlimited complexity in distribution patterns, and to have flexibility as well. In addition, in regards to reaction channels, it is desirable to have a large number of identical channels for scaling out capacity, and for single-fluid reactions it is desirable to have open channels with un-complex geometry. In general, micromachining allows for the creation of highly complex, two-dimensional structures down to sub-micron resolutions. Additionally, extrusion generally creates multiple, uniform parallel reaction channels from a myriad of materials (e.g., ceramic or metal materials) with controllable wall thicknesses, geometries, porosities, etc.

Figure 8:
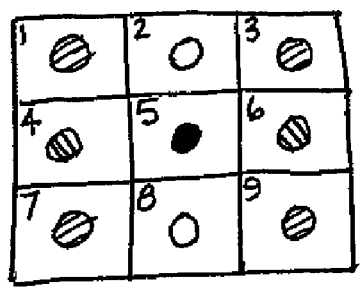
FIGS. 8, 9, and 10 illustrate three different examples provided in accordance with the present disclosure of a chemical reactor coupling three or more separate kinematic and transport processes within a single unit or reactor.
Figure 9:
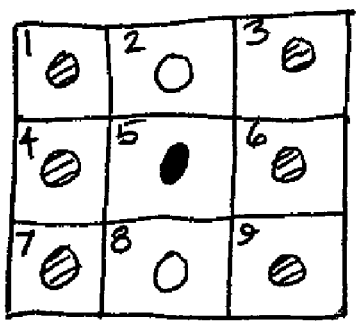
Figure 10:
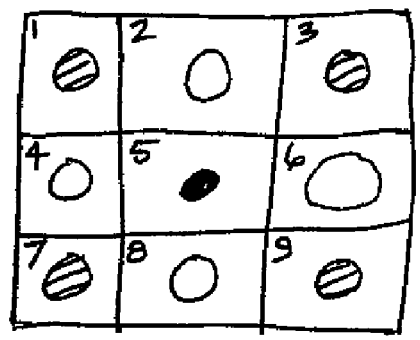

Referring now to FIGS. 8, 9 and 10, three different examples are provided of a chemical reactor coupling three or more separate kinetic and/or transport processes within a single unit or reactor (e.g., within a single cartridge-based unit or reactor). In an exemplary embodiment and as shown in FIG. 8, a high-temperature or partial oxidation reforming feed (e.g., to convert fuel into $H_2$, $CO_2$) may pass through cell or channel number 5 of a reactor in a first axial direction, which feed may then be re-directed and returned as a distributed preferential oxidation feed for the preferential oxidation of carbon monoxide (CO) through cells or channels numbered 4 and 6 of a reactor in an opposite second axial direction, and which may then again be re-directed, further distributed, and returned as a distributed membrane feed for extracting hydrogen through cells or channels numbered 1, 3, 7 and 9 in the first axial direction. A distributed membrane sweep for receiving the hydrogen extracted from the membrane feed cells or channels is shown at cells or channels numbered 2 and 8.

In another embodiment and as shown in FIG. 9, a combustion feed (e.g., containing a mixture of fuel and air for reacting with a platinum catalyst and thereby producing heat) may pass through cell or chamber number 5 of a reactor in a first axial direction, and a vaporization feed for generating steam via heat from the combustion feed cell may pass through cells or channels numbered 2 and 8 in an opposite second axial direction, the latter being re-directed, mixed with fuel, and returned as a steam reforming feed through cells or channels numbered 1, 3, 4, 6, 7 and 9 in the first axial direction.

As shown in FIG. 10, a combustion feed may pass through cell or chamber number 5 in a first axial direction, and a distributed preferential oxidation/membrane feed for: i) the preferential oxidation of carbon monoxide (CO); and ii) extracting hydrogen (e.g., via a membrane that is hydrogen perm selective) may pass through cells or chambers numbered 2, 4, 6 and 8, and a distributed membrane sweep for receiving the hydrogen extracted from the preferential oxidation/membrane feed cells may pass through cells or chambers numbered 1, 3, 7 and 9. It is to be appreciated that numerous other variations and/or combinations are possible.

Turning now to FIGS. 11A-11D, three processes are coupled in accordance with the present disclosure, wherein such process integration provides numerous benefits, including, for example, improvements in heat transfer. More particularly and as shown in FIGS. 11A-11D, a system and related method is provided in which three distinct processes (e.g., vaporization, steam reforming, and combustion) are integrated within a single mini- or micro-channel network or monolith 111. As shown in FIGS. 11C-11D, exemplary systems and methods include embodiments in which three distinct processes may take place in accordance with a one-dimensional radial distribution of fluidic flow as shown in FIG. 11C, as well as embodiments in which three distinct processes may take place in accordance with a two-dimensional radial distribution of fluidic flow, as shown in FIG. 11D.

Illustrated in FIG. 12A-12D are three processes coupled in accordance with the present disclosure, wherein such process integration provides numerous benefits, including, for example, improvements in mass transfer. More particularly, a system and related method is provided in which three distinct processes (e.g., steam reforming, secondary hydrogen removal, and sweep gas passage) are integrated within a single mini- or micro-channel network 122. As shown in FIGS. 12C-12D, exemplary systems and methods include examples in which these three distinct processes may take place in accordance with a one-dimensional radial distribution of fluidic flow as shown in FIG. 12C, as well as examples in which these three distinct processes take place in accordance with a two-dimensional radial distribution of fluidic flow, as shown in 12D. It is to be appreciated that numerous other examples/embodiments are possible.

Figure 13:
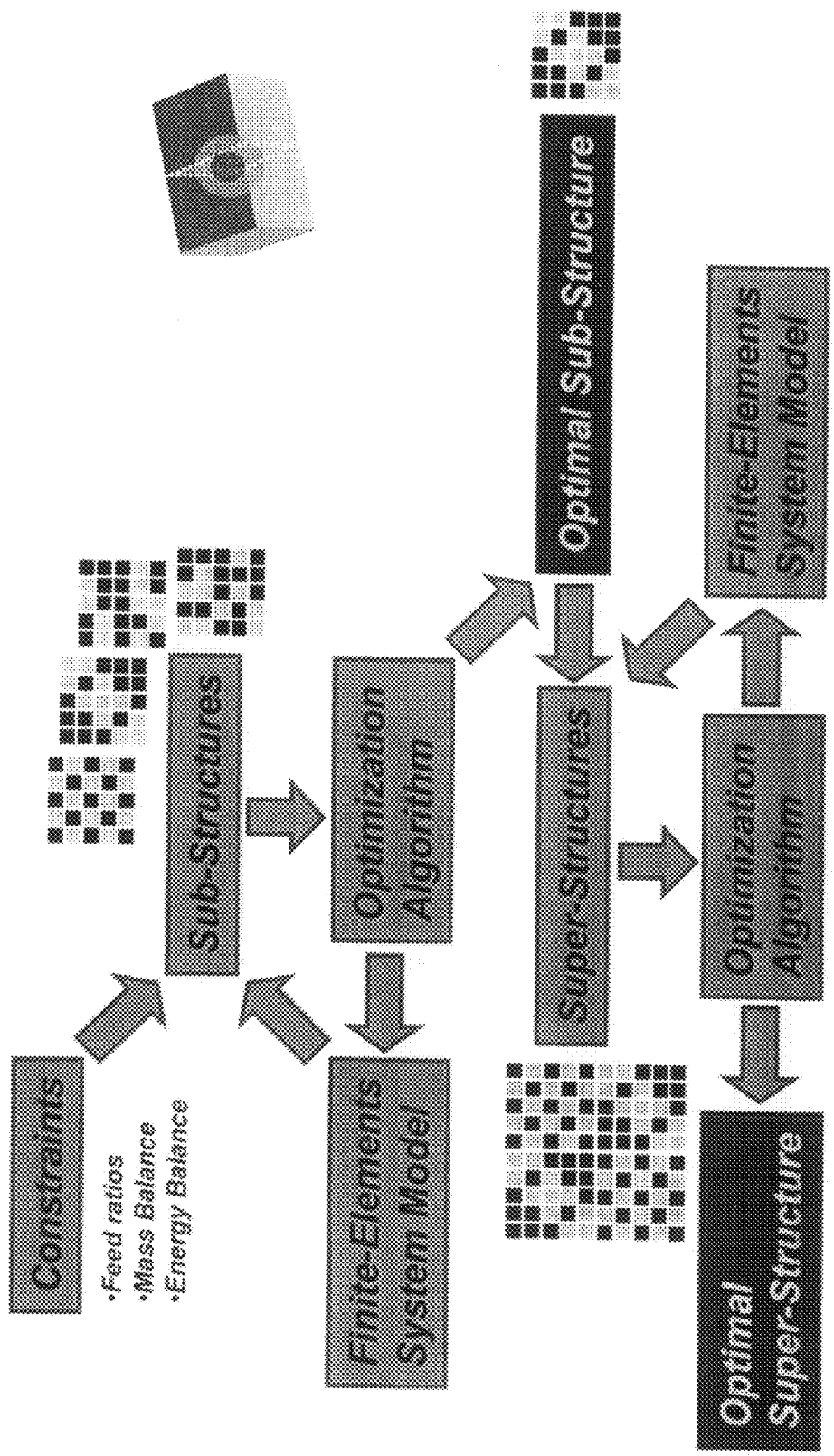
FIG. 13 illustrates an exemplary process (e.g., an iterative design process) of optimizing fluidic flow distribution in an integrated reformer in accordance with the present disclosure.

As shown in FIG. 13, a process of optimizing fluidic flow distribution in an integrated reformer is provided in accordance with exemplary embodiments of the present disclosure. More particularly, feed ratios, mass balance, and/or energy balance may constitute design constraints, and optimal substructures may be determined from among a number of candidate substructures according to a first algorithm involving, for example, finite-element system modeling, and an optimal superstructure using multiple instances of the optimal substructure(s) may be determined from a number of candidate superstructures according to a second algorithm involving, for example, finite-element system modeling. Such optimization of fluid distribution patterns in accordance with the present disclosure may be solved via finite-elements methods using, such as, for example, Matlab and/or Comsol software. For example, multi-dimensional modeling of the system may include one or more of: 1) use of a one-dimensional axial dispersion model for fluid phase (e.g., to streamline computational costs, recognizing that primary thermal effects exist in solid phase); 2) use of multi-dimensional conduction modeling of solid-phase (coupled through boundaries to fluid phase models); 3) determining the effects of solid phase geometry and thermal conductivities upon heat transport and temperature gradients; 4) determining the effects of radial distribution patterns upon solid-phase heat transport and temperature gradients; and/or 5) generating a verified model, which may be useful as a design tool for subsequent fluid distribution pattern optimization. It is to be appreciated that other steps and/or advantages are possible in regards to the use of multi-dimensional modeling of the system.

In exemplary embodiments, the utilization of two-dimensional networks of unique, separate process flows in a variety of radial distribution properties in accordance with the present disclosure also allows for combining several membranes in both series and/or parallel within a single integrated structure. Furthermore, by alleviating the high costs associated with micromachining large networks of mini- or micro-channels, a cost-effective, scalable and configurable mini- or micro-channel network (e.g., a ceramic mini- or micro-channel network) may be realized in accordance with the present disclosure. Connection of individual channels in series may be implemented in accordance with the present disclosure, e.g., for realizing self-insulating designs. Thus, a major hurdle in micro-membrane design (e.g., the insulation of a micro-device) can also be overcome with design concepts in accordance with embodiments of the present disclosure.

In exemplary embodiments of the present disclosure, mini- or micro-channel networks (e.g., ceramic or metal mini- or micro-channel networks) allow coupling of reaction and separation with mass transfer between multiple process streams, as well as coupling of reactions, fuel vaporization, and effluent cool-down with heat transfer between multiple process streams. In both cases, two-dimensional distribution patterns may be employed, allowing the design of three-dimensional, self-insulating temperature and concentration gradients. Additionally, reactor designers are provided the ability to integrate catalytic anti-corrosion coatings for maximum permselective film stability. For example, films including palladium and/or Perovskite may be employed for flexibility in operating temperatures, and/or for stability challenges.

Referring now to FIG. 14, a mini- or micro-channel device or reactor 290 according to an exemplary embodiment of the present disclosure is shown. In one embodiment, the device 290 includes a distributor which includes two distributor blocks or heads 291 which may be configured and dimensioned to evenly distribute at least two unique process fluids in parallel via a checker-board pattern 292 amongst nine (e.g., 3×3) channels cut from a larger monolith block 293 (e.g., 65 cells per in$^2$). For example, the channels may be cut from a ceramic, cordierite or metal monolith block 293, although the present disclosure is not limited thereto. As shown in FIG. 14, the inset of the monolith block 293 illustrates a checker-board pattern 292 having a distribution of fluid A amongst five channels, and of fluid B amongst the remaining four channels. It is to be appreciated that numerous other checker-board and/or distribution patterns are available. In one embodiment, the individual channels are square, with a width of about 2.5 mm and a wall thickness of about 0.75 mm, although the present disclosure is not limited thereto. Rather, the individual channels may take a variety of forms, shapes and/or sizes.

In exemplary embodiments, each distributor block or head 291 may be fabricated via machining. For example, each distributor block or head 291 may be fabricated via at least one process selected from a group including, without limitation, machining, micromachining, microelectromechanical systems (MEMS) photolithography and/or chemical etching techniques, and/or fusion bonding of separately machined plates. In one embodiment, each distributor block or head 291 is fabricated via machining capable of a minimum feature size of about 800 μm.

Each distributor may be fashioned from a stack of three plates or the like, with each plate machined with two layers of a three-dimensional distribution pattern (e.g., utilizing microelectromechanical systems (MEMS) photolithography and/or chemical etching techniques) and subsequently bonded. In one embodiment, the distributor is fabricated from a stack of three acrylic plates or the like, although the present disclosure is not limited thereto. For example, the distributor 291 may be fabricated from brass, copper, silicon, etc. In general, each distributor 291 is capable of operating from about −70° C. to about 80° C. In exemplary embodiments and as shown in FIG. 14, one distributor block or head 291 may include a first fluid inlet 295 and a second fluid inlet 296, and the other distributor block or head may include a first fluid outlet 297 and a second fluid outlet 298.

In one embodiment, a fourth plate (sometimes referred to as the packaging plate) provides fluid connection between the distributor 291 and the monolith 293. In general, the face of the packaging plate may be machined with a recessed mold of the monolith face, providing alignment and sufficient contact area for quality sealing via epoxies, for example. The backside of the packaging plate may be compression sealed to the main distributor block. For example, the backside of the packaging plate may be compression sealed to the main distributor block by using an 800 μm thick viton gasket or the like and two bolts.

Referring again to FIG. 7, a mini- or micro-channel device or reactor 190 according to an exemplary embodiment of the present disclosure is shown. In one embodiment, the device 190 includes a distributor which includes two distributor blocks or heads 191 which may be configured and dimensioned to evenly distribute at least two unique process fluids in parallel via a checker-board pattern 192 amongst twenty-five (e.g., 5×5) channels cut from a larger monolith block 193. For example, the channels may be cut from a ceramic, cordierite or metal monolith block 193. It is to be appreciated that numerous other checker-board and/or distribution patterns 192 are available.

As shown in FIG. 7, each distributor block or head 191 may be fashioned from a stack of at least four plates or the like, with each plate machined with two layers of a three-dimensional distribution pattern, and subsequently bonded. In one embodiment, the distributor is fabricated from a stack of four plates or the like (e.g., acrylic, brass, silicon, etc.), although the present disclosure is not limited thereto. In exemplary embodiments, one distributor block or head 191 may include a first fluid inlet 195 and a second fluid inlet 196, and the other distributor block or head may include a first fluid outlet 197 and a second fluid outlet 198 (not shown).

Measurement of residence time distributions (RTD) in the mini- or micro-channel network may be accomplished by tracer injections of aqueous celestine-blue dye solutions or the like. Effluent dye concentration versus time profiles were obtained using a calibrated UV-Vis spectrophotometer and flow-through cuvette continuously monitoring absorbance at about 430 nm. As shown in FIG. 15, concentration versus time data was obtained for: (i) flow through a single cordierite channel; (ii) fluid A through 4 channels; and (iii) fluid B through 5 channels within the 9-channel network. As depicted in FIG. 15, this data is presented alongside calculated axial dispersion coefficient, $D_a$. The results indicate that no significant increase in dispersion is introduced by the distributors 291. Additional tests confirmed leak-free sealing of each channel to the distributors 291, ensuring no mixing between the two separated flows, for the case of viscous fluids, for example.

Alumina washcoats may be used in accordance with the present disclosure for supporting catalyst metals and metal oxides (e.g. Pt, $CuO_2$), and/or as a support for perm-selective films in gas-phase separations. In exemplary embodiments, samples cut from monolith substrates were coated with a single layer of porous alumina via a slurry-coating technique (see, e.g., Nijhuis, T. A., A. E. W. Beers, T. Vergunst, I. Hoek, F. Kapteijn and J. A. Moulijn, "Preparation of Monolithic Catalysts," Catalysis Reviews, 43(4), 345-380 (2001)) and analyzed via scanning-electron microscopy (SEM).

In general, alumina coatings provide uniform, low-surface roughness basecoats for subsequent electroless plating of hydrogen permselective palladium films. These coatings also may provide a foundation for subsequent deposition of perm-selective films for hydrogen purification, or membrane reactor configurations combining hydrogen generation with purification. Typically, optimal films are obtained using multiple alumina layers of reducing surface roughness, finished with a nano-porous sol-gel coat. Experiments employed a single alumina washcoat layer to verify the ability to deposit palladium films in the monolith structure (e.g., cordierite monolith structure). Results verified that slurry-coating methods proposed in accordance with the present disclosure are capable of yielding continuous, microporous catalyst films of thicknesses of about 5 to about 200 microns, including film thicknesses of about 5 to about 50 μm for catalytic generation of hydrogen. Refinement of this methodology is possible to achieve thin (e.g., about 2 to about 10 μm) palladium permselective films. Microscopy images of alumina films on monolith supports are shown in FIG. 16.

Figure 17A:
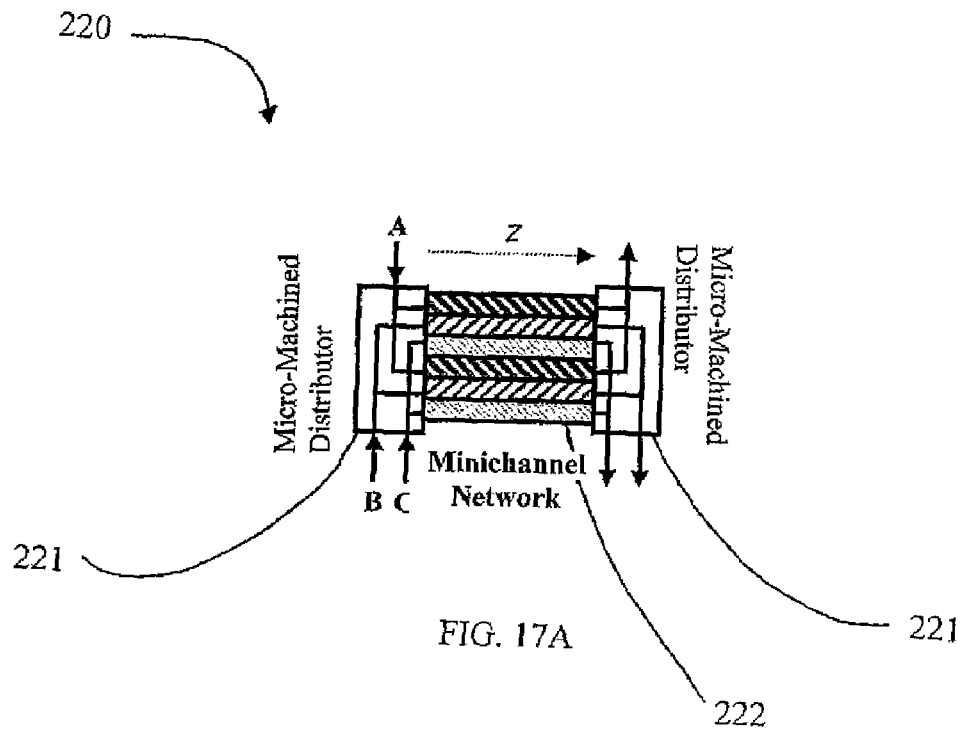
FIGS. 17A and 17B are depictions of an exemplary mini-channel device in accordance with the present disclosure including machined distributor plates packaging an N×4 and/or an N×6 mini- or micro-channel network (e.g., a ceramic monolith support) and associated with a two-dimensional radial distribution of three separate flows.
Figure 17B:
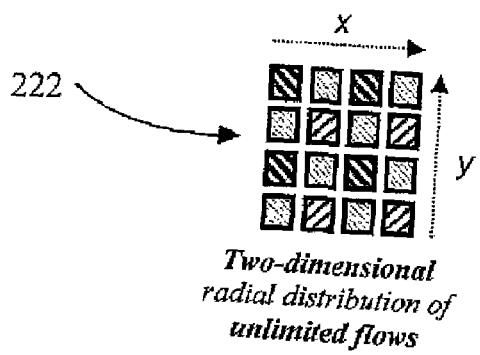

Referring now to FIG. 17A, an exemplary mini- or micro-channel device or reactor 220 is shown in accordance with the present disclosure. As shown in FIG. 17A, exemplary mini- or micro-channel device 220 may include two micro-machined flow distribution heads 221 and a mini- or micro-channel network 222. For example and as shown in FIG. 17A, the mini- or micro-channel network 222 may be an N×6 mini- or micro-channel network. In another embodiment and as shown in FIG. 17B, the mini- or micro-channel network 222 may be a 4×4 mini- or micro-channel network. It is to be appreciated that the mini- or micro-channel network may take a variety of forms. In general, the mini- or micro-channel network is capable of combining three or more unique process channels in series or parallel with unrivalled complexity in distribution pattern.

In accordance with exemplary embodiments of the present disclosure, the mini- or micro-channel device 220 allows creation of complex heat and mass transport integration of several unique chemical and/or physical processes within a single device or reactor (e.g., within a single cartridge-based mini- or micro-channel network and/or device). For example, by implementing extrusion (e.g., ceramics extrusion) and processing methods to realize the mini- or micro-channel network 222 at competitive costs (while retaining the technology enabling catalyst and permselective film introduction), microfabrication and/or precision-machining methods are focused upon construction of complex distributors or heads 221 which enable the channel-specific packaging necessary. In exemplary embodiments and as shown in FIGS. 18 and 19, by employing a separate two-step fabrication procedure, an interchangeable cartridge based system may be realized. For example and as shown in FIGS. 18 and 19, the mini- or micro-channel network and/or monolith 31 may be fabricated separately from the distributor blocks or heads 32. As such, the distributor blocks or heads 32 may be utilized in conjunction with multiple mini- or micro-channel networks and/or monoliths 31.

In exemplary embodiments, baseline palladium perm-selective films were deposited via electroless plating within the extruded monolith structure (e.g., cordierite monolith structure), following single alumina-layer basecoat deposition. Electroless plating of about 2 to about 20 μm palladium films has been reported on porous stainless steel and ceramic tubular supports (see, e.g., Yueng, K. L. and A. Varma, "Novel Preparation Techniques for Thin Metal-Ceramic Composite Membranes," AIChE Journal, 41(9), 2131-2139 (1995)).

In exemplary embodiments of the present disclosure, alumina coated cordierite channels were first "seeded" with tin (II) chloride. The coated and seeded cordierite channel walls were then submerged in electroless plating solutions comprised of palladium chloride in dilute, alkaline hydrazine with surfactant (EDTA), and the plating reaction was then allowed to proceed. Surface roughness of the single alumina-layer basecoat was on the order of about 1 μm, requiring palladium film thicknesses greater than 20 μm to ensure defect-free films. Further film improvement may be possible via (i) inclusion of an additional sol-gel alumina layer for reduced surface roughness, and (ii) osmotic-pressure electroless plating for greater adhesion. Referring now to FIG. 20, scanning-electron images of baseline palladium permselective coatings produced via electroless plating on a single alumina washcoat layer are shown. Further refinement of alumina coating procedures and electroless plating methods are possible to obtain thin (e.g., less than about 10 μm) palladium films.

Initial mass transfer studies were performed by isolating two parallel channels and addressing one with a binary gas mixture of interest, and a second with an inert sweep gas. Spectroscopic analysis of sweep effluent allowed calculation of gas permeabilities between both untreated and alumina washcoated cordierite channels, summarized in Table 3 below. Data demonstrated that untreated cordierite did not introduce any significant permselectivity to light gases, and that the cordierite walls and alumina coatings did not introduce a significant mass transport resistance.

TABLE 3

Summary of measured gas permeabilities (units: mol · m$^{-1}$ · sec$^{-1}$ · atm$^{-1}$) in untreated cordierite and washcoated alumina films (50 μm).

| Gas | Cordierite | Alumina-Cordierite |
|---|---|---|
| $O_2$ | $7.0 \times 10^{-1}$ | $2.1 \times 10^{-1}$ |
| $N_2$ | $6.7 \times 10^{-1}$ | $2.1 \times 10^{-1}$ |
| He | $7.2 \times 10^{-1}$ | $2.3 \times 10^{-1}$ |

The disclosure will be further described with respect to the following examples; however, the scope of the disclosure is not limited thereby.

Example 1

All-in-One Hydrogen Extraction from Ethanol

In accordance with exemplary embodiments of the present disclosure, coupling of multiple membrane processes and catalytic reforming steps within a single unit was demonstrated, such that the overall system efficiency, portability and cost-effectiveness was increased substantially. The extraction of pure hydrogen gas from ethanol was accomplished in accordance with embodiments of the present disclosure by coupling multiple stage-wise catalytic membrane purification processes within a single structure. Composite membranes which included a dense palladium perm-selective film coated with a porous catalytic washcoat was employed for each stage of hydrogen extraction. For example, sufficient catalyst washcoat thicknesses ensure that corrosives are destroyed before reaching the palladium surface. As shown in FIGS. 21A-B, the system couples (i) catalytic steam reforming membranes in series with (ii) water-gas-shift membranes to extract hydrogen while concentrating carbon dioxide by-product for venting or sequestration. More particularly, FIGS. 21A-B depicts a system coupling three separate membrane process flows: (i) an ethanol steam reforming membrane; (ii) a hydrogen/carbon dioxide effluent separation, with water-gas-shift catalyst to compensate for imperfect reforming selectivity; and (iii) high-purity hydrogen sweep channels, FIG. 21A depicts a radial cross-section illustrating two-dimensional distribution patterns for achieving desired ratios of each low volume. FIG. 21B depicts a side-view of three parallel channels, showing series and parallel connectivity.

Thus, in exemplary embodiments, the present disclosure provides efficient, integrated harvesting of hydrogen from fuel (e.g., ethanol biofuel). In general, ethanol is a renewable fuel, obtainable from several region-specific agricultural products and cellulosic sources. Fundamental findings with respect to the present implementation relating to reactor design, specifically the balancing of multiple transport processes and management of resulting three-dimensional concentration gradients support, support integrated micro-membrane designs coupling three or more processes or exploiting flow-folding schemes for self-insulation.

A. Deposition and Characterization of Permselective Films

Low surface-roughness alumina coatings were produced via multiple slurry-coat depositions, each of decreasing thickness and particle size. Slurry-coated films were then covered with a final sol-gel coating to minimize surface roughness, as demonstrated by Roa, F., J. D. Way, R. L. McCormick and S. N. Paglieri, "*Preparation and Characterization of Pd—Cu Composite Membranes for Hydrogen Separation,*" Chem. Eng. J., 93, 11-22, (2003). Analysis of film uniformity and surface roughness was performed via scanning-electron microscopy (SEM) and optical microscopy to determine film thickness and verify crack-free coatings. Surface roughness was measured by combination of white-light interferometry and atomic-force microscopy (AFM). Gas permeabilities and permselectivities were measured for all relevant gases (e.g., ethanol, water, carbon dioxide, oxygen, nitrogen, helium and hydrogen) to quantify mass transfer resistances introduced by alumina films and to predict protective catalyst layer depth required to prevent CO-poisoning of palladium films. Thermal stability of inhomogeneous films was studied over multiple thermal cycles from about 25° C. to about 600° C.

The method of electroless plating was employed to coat dense palladium films into individual mini- or micro-channels (e.g., ceramic mini- or micro-channels). This method was refined to utilize electroless plating in the presence of osmotic pressure for greater film uniformity and substrate adhesion (see, e.g., Yueng, K. L, and A. Varma, "*Novel Preparation Techniques for Thin Metal-Ceramic Composite Membranes,*" AIChE Journal, 41(9), 2131-2139 (1995)). In general, the system facilitated the introduction of osmotic pressures across the membrane surface by passing separate solutions through individual channels using prototype distributors. Recirculation of plating solution was employed to ensure that depletion of palladium ions within individual channels did not result in non-uniform plating thickness in the axial direction. Plating thickness was confirmed by scanning-electron microscopy (SEM) and surface composition by x-ray photoelectron spectroscopy (XPS). Mechanical stability of alumina-palladium and alumina-palladium-alumina composite films were quantified over multiple thermal cycles.

Figure 22:
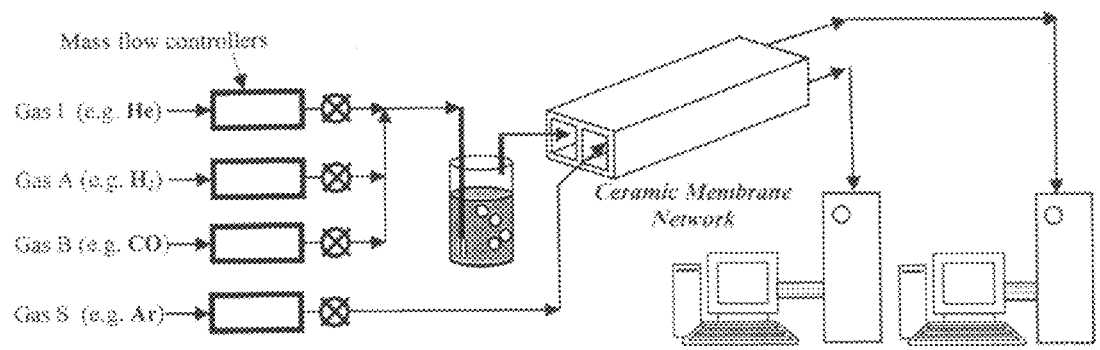
FIG. 22 is a schematic representation of an exemplary apparatus for testing permselective films in accordance with the present disclosure.

All coatings were investigated for permeability and selectivity of relevant gases. As shown in FIG. 22, the testing apparatus included gas mixing manifolds for controlling feed and sweep compositions and flowrates, a temperature controlled bubbler (e.g., a liquid bubbler) for ethanol and/or water introduction, fluidic connections to cordierite channel networks, and both mass-spectroscopy and gas chromatography equipment for monitoring effluent compositions. This setup allowed measurement of hydrogen flux and selectivity as a function of driving force (e.g., hydrogen partial pressures in both feed and sweep channels), temperature and contaminant partial pressure. Palladium films were studied over a range of conditions to evaluate (i) permeability via Sievert's Law analysis, and (ii) film tolerances to ethanol reforming chemistry (e.g. $H_2O$, EtOH, $CO_2$, CO). The latter durability studies were coupled with post-mortem materials analysis to identify poisoning and surface effects via XPS. In this manner, performance and durability of resulting alumina and palladium-on-alumina micro-channels was compared with conventional systems reported in the literature. More importantly, this information guided the selection of catalyst washcoatings that provide protection to the palladium film.

B. Deposition of Catalytic Coatings

Construction of the composite palladium-catalyst membrane was completed via washcoating of catalyst layers over the deposited palladium permselective film. With appropriate catalyst selection and coating thickness, this second layer prevents corrosives and poisons from reaching the palladium film. Copper and zinc/copper-on-alumina (water-gas-shift) and cobalt-on-alumina (ethanol steam reforming) coatings were investigated. Both catalysts were suitable for this reaction chemistry (see, e.g., Lloyd, L., D. E. Ridler and M. V. Twigg, "*The Water-Gas Shift Reaction,*" Pages 283-338 in: Catalyst Handbook, M. V. Twigg (eds), $2^{nd}$. Ed, Wolfe Publishing, Frome 1989; Haga, F., T. Nakajima, H. Miya and S. Mishima, "*Catalytic Properties of Supported Cobalt Catalysts for Steam Reforming of Ethanol,*" Catal. Lett., 48, 223-227 (1997)). While the present implementation relates to the use of established catalysts, in accordance with the present disclosure, a design is possible of perovskite electrocatalysts for greater selectivity towards hydrogen. Other suitable catalysts may be used as well.

In both cases, catalyst powders were prepared prior to introduction to the membrane via washcoating. Alumina powders impregnated with copper and cobalt at loadings of about 0.5 to about 2 wt % were purchased from chemical suppliers, or prepared by incipient wetness technique by soaking alumina powders in aqueous solutions of copper (II) nitrate, $Cu(NO_3)_2$, zinc (II) nitrate, $Zn(NO_3)_2$, and cobalt (II) nitrate, $Co(NO_3)_2$, followed by calcination in air and reduction in hydrogen gas (Thomas, J. M. and W. J. Thomas,

*Principles and Practice of Heterogeneous Catalysis*, VCH, Weinheim, 1997). By impregnating alumina powders with catalyst via salt solution prior to washcoating, potential damaging of the underlying palladium film was avoided. A slurry-coat solution was then prepared by mixing the impregnated alumina catalyst powders in colloidal alumina solution with methanol or water solvent. This method has previously been used to successfully create palladium-catalyst composite membranes for hydrogen extraction from methanol (see, e.g., Wilhite, B. A., S. E. Weiss, J. Y. Ying, M. A. Schmidt and K. F. Jensen, "*Demonstration of 23 wt % Ag—Pd Micromembrane Employing 8:1 LaNi0.95Co$_{0.05}$O$_3$/Al$_2$O$_3$ Catalyst for High-Purity Hydrogen Generation,*" Advanced Materials, 18, 1701 (2006)). In that study, uniform catalyst adhesion to the underlying palladium film was consistently observed over the temperature range of about 25° C. to about 475° C.

Characterization of washcoat uniformity and catalyst deposition was performed by SEM, Transmission Electron Microscopy (TEM), and x-ray diffraction (XRD) to determine catalyst phase composition and correlate particle size with electron microscopy data.

Figure 23:
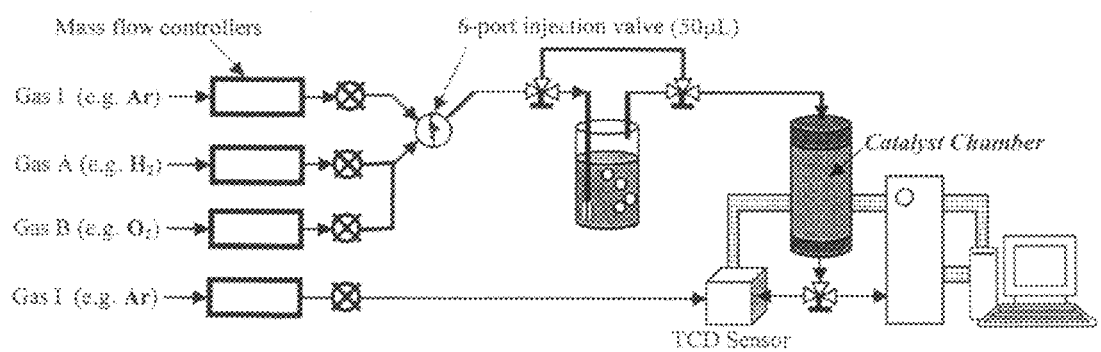
FIG. 23 is a schematic representation of an exemplary apparatus for testing catalysts in accordance with the present disclosure.

Catalyst coatings were tested to determine dispersion, activity and selectivity for steam reforming of ethanol to hydrogen and carbon dioxide. As shown in FIG. 23, a testing apparatus was constructed to perform these tasks in parallel to the gas permeability experiments described above. Catalyst active surface area was determined by hydrogen-oxygen and carbon monoxide-oxygen titrations, following standard methods. Pulses of titrant gas (about 10 μL) were fed to a temperature-controlled catalyst chamber at timed intervals and effluent compositions were monitored by a thermal conductivity detector (TCD). This data allowed back-calculation of active sites based upon the amount of CO/$H_2$ and $O_2$ adsorbed/consumed, according to the mechanisms in Table 4 below. In addition, Table 5 further sets forth $H_2$/$CO_2$—$O_2$ titration methods.

TABLE 4

| Ethanol Steam-Reforming Chemistry | |
|---|---|
| $C_2H_5OH + 3 H_2O \rightarrow 2CO_2 + 6H_2$ | Steam Reforming |
| $C_2H_5OH \leftrightarrow CO + H_2 + CH_4$ | Decomposition |
| $CO + H_2O \leftrightarrow CO_2 + H_2$ | Water-Gas-Shift |

TABLE 5

| $H_2$/$CO_2$—$O_2$ Titration Method | |
|---|---|
| $H_2 + * \rightarrow H_2 \cdot *$ | Adsorption |
| $CO + * \rightarrow CO \cdot *$ | (cycle 1) |
| $\frac{1}{2} O_2 + H_2 \cdot * \rightarrow H_2O + *$ | Adsorption |
| $\frac{1}{2} O_2 + CO \cdot * \rightarrow CO_2 + *$ | (cycle 2) |

*denotes catalyst active site

Catalyst activity and selectivity was tested by passing an inert gas mixture of helium and nitrogen internal standard (about 4%) through a temperature-controlled bubbler containing the ethanol-water fuel mixture to a temperature controlled catalyst chamber and out through an Agilent 3000A micro-gas chromatograph configured for light-gas analysis. Conversion rates and selectivities were measured over a range of fuel-to-water ratios and reaction temperatures to determine optimal operating conditions. Reaction-diffusion modeling of anti-corrosion coatings predict required catalyst coating thicknesses for prevention of corrosion and CO-poisoning of palladium membranes. Additionally, improvements in mechanical stability via oxide-Pd-oxide sandwich composite structures were quantified. This system was also employed to verify that untreated alumina washcoatings did not contribute to undesired side-reactions that reduce hydrogen production. This information, coupled with results from hydrogen permeation data, provides the basis for designing the integrated membrane system, detailed below.

C. Fabrication of High-Temperature Distributors

Distributor designs for combining catalytic hydrogen extraction and effluent cleanup in series, with hydrogen sweep channels in parallel, were prototyped in acrylic. Construction of prototype distributors was performed using conventional machining facilities, capable of feature sizes down to about ⅟₃₂", as described above. This provides a rapid, inexpensive means to perform low-temperature (e.g., T<200° C.) experiments for measuring heat and mass transport while evaluating new distributor designs. Additionally, acrylic distributors can be used for distributing multiple catalyst coating solutions amongst individual channels for realizing designs coupling multiple catalytic steps.

Measurements of residence time distributions (RTD) in the mini- and micro-channel networks by established methods (see, e.g., Kulkarni, R., R. Natividad, J. Wood, E. H. Stitt and J. M. Winterbottom, "*A Comparative Study of Residence Time Distribution and Selectivity in a Monolith CDC Reactor and a Trickle Bed Reactor,*" Catal. Today, 105(3-4), 455-463 (2005); Schwartz, J. G., E. Weger and M. P. Dudukovic, "*A New Tracer Method for Determination of Liquid-Solid Contacting Efficiency in Trickle-Bed Reactors,*" AIChE Journal., 22(5), 894-904 (1976)) allow quantification of distribution uniformity for verifying mass transfer data while providing a comparison with micro-fabricated networks reported in the literature (Trachsel, F., A. Gunther, S. Khan and K. F. Jensen, "*Measurement of Residence Time Distribution in Microfluidic Systems,*" Chem. Eng. Sci., 60(21), 5729-5737 (2005)). Separate RTD measurements of isolated individual channels allow estimation of single-channel dispersion coefficients, to account for the significant role of dispersion in designing micro-fluidic systems.

Figure 24:
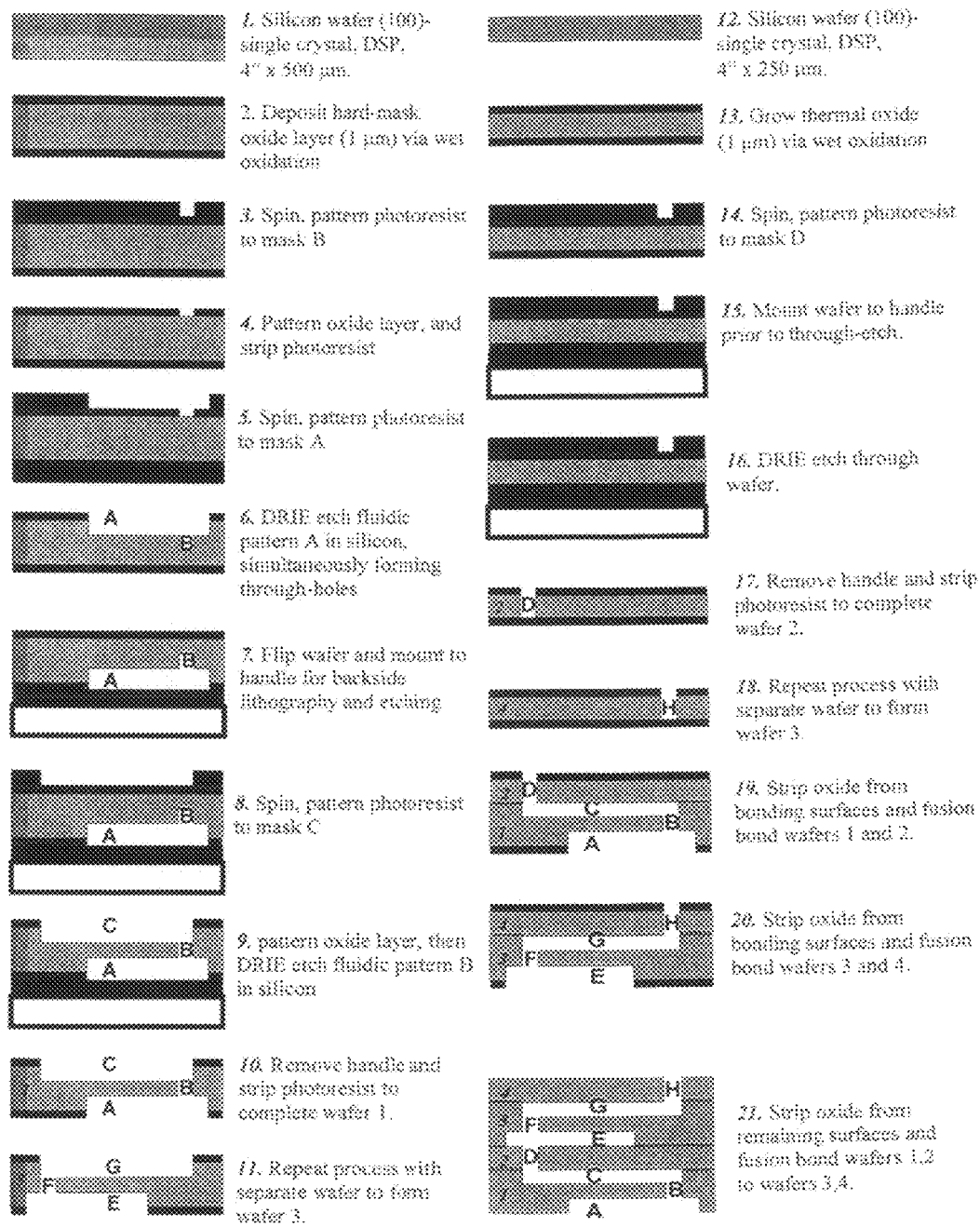
FIG. 24 sets forth a schematic of an exemplary process for fabricating a distributor in accordance with the present disclosure.

Following low-temperature (e.g., T<200° C.) mass transfer studies and refinement of distributor design, related techniques described herein may be extended to fabrication in silicon using similar photolithography and chemical etching techniques employed for making microchemical and micro-electromechanical (MEMS) systems. In general, micromachining distributors from silicon allows batchwise creation of distributors capable of addressing large (e.g., >10×10) networks of membrane channels with highly complex patterns out of high-temperature material. A schematic of an exemplary fabrication process is provided in FIG. 24, which is similar to other techniques described herein. In an exemplary embodiment, this method constructs four silicon plates, containing a total of eight layers including the overall microfluidic network. Fusion bonding allows high-temperature, high-pressure sealing between individual plates (see, e.g., London, A. P., A. A. Ayon, A. H. Epstein, S. M. Spearing, T. Harrison, Y. Peles and J. L. Kerrebrock, "*Microfabrication of a High Pressure Bipropellant Rocket Engine,*" Sensors and Actuators, A: Physical, 92(1-3), 351-357 (2001); Mirza, A. R., A. A. Ayon, "*Silicon Wafer Bonding for MEMS Manufacturing,*" Solid State Technol., 42(8), 73-78 (1999)) to complete the four-wafer stack. Facilities for microfabrication were available through the Cornell Nanofabrication Facility (CNF). The resulting distributor may be compression-sealed to a fluidic chuck providing conventional plumbing connections to reactants and analysis equipment.

As discussed above, silicon rubbers and commercial epoxies enable low-temperature sealing (e.g., T<250° C.) of the monolith face to the distributor. For high-temperature conditions associated with catalytic studies, additional efforts focus upon verifying effective sealing between the silicon and ceramic surfaces. Bond quality may be investigated by spectrographic analysis of mixing over the range of operating temperatures (e.g., about 25° C. to about 600° C.), supported by scanning-electron microscopy (SEM) of bond quality and failure mechanisms, available on-campus at the University of Connecticut in the Institute for Materials Science.

Materials include (i) alumina-based adhesives, (ii) glass-frit and (iii) brazing materials (see, e.g., Schmidt, M. A., "Wafer-to-Wafer Bonding for Microstructure Formation," Proceedings of the IEEE, 86(8), 1575-1585 (1998)). Sealing materials may be selected based upon thermal conductivities, thermal expansion and melting point, such that bonds provide a bridge in thermal properties between ceramic mini- or micro-channels and silicon packaging layers.

D. Investigation of Coupled Hydrogen Generation with Purification

Through the combination of techniques described above, integrated membrane networks for hydrogen extraction from fuel and/or fuel mixtures (e.g., ethanol-water fuel mixtures) may be advantageously provided. Mini- or micro-channel networks (e.g., ceramic mini- or micro-channel networks) were coated such that substantially all channels contained an alumina-supported dense palladium permselective film for hydrogen separation, while channels designated for membrane reactor configuration were also coated with a second catalytic alumina-based washcoat. The resulting ceramic network was packaged with silicon micromachined distributors for high-temperature operation. The integrated membrane reformer so constructed was placed in a temperature-controlled furnace for investigating performance over a temperature range of about 300° C. to about 600° C. and ethanol-water ratios of about 0.25 to about 2, for purposes of demonstration.

Figure 25:
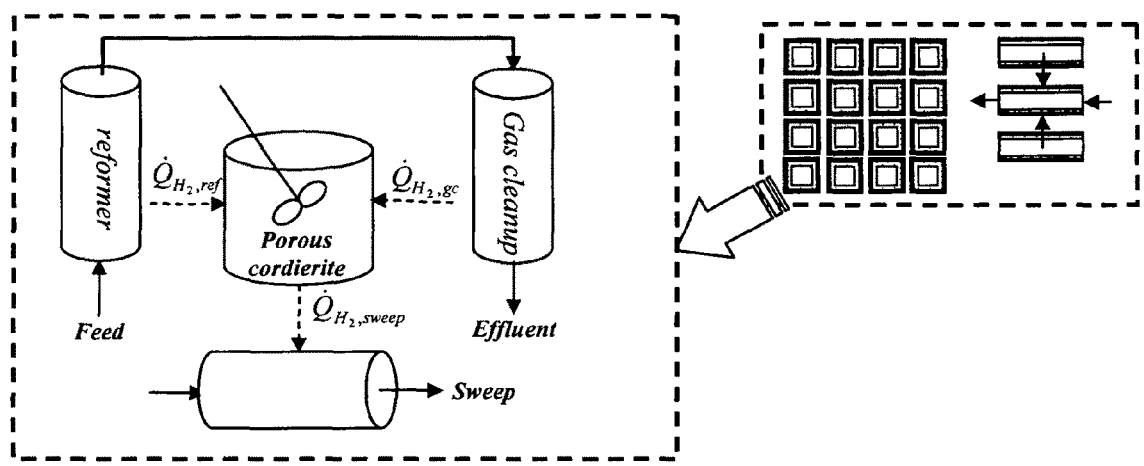
FIG. 25 is a schematic representation of an exemplary one-dimensional PFR model for an integrated membrane system in accordance with the present disclosure.

Design analysis employs hydrogen permeability data from as described above and ethanol conversion and hydrogen selectivity values, and requires designation of a target overall hydrogen recovery and target hydrogen sweep partial pressure. This information was employed in a one-dimensional network of plug-flow models to estimate necessary volume ratios of reforming, gas cleanup and sweep channels. As shown in FIG. 25, this model assumes that the macroporous cordierite support has sufficiently high hydrogen permeability relative to palladium films to behave as a well-mixed volume (e.g., in the absence of significant concentration gradients), in turn allowing one-dimensional modeling of the solid-phase. Development of one-dimensional models of the proposed systems, coupled with experimental results obtained from this work, provided the required groundwork for developing three-dimensional heat and mass transport models of the integrated membrane reactor network via finite-elements techniques in COMSOL and/or Fluent, for example.

In exemplary embodiments, cordierite mini- or micro-channel networks of about 25 to about 100 channels were prepared based upon design calculations. First, all channels were coated with a non-catalytic, uniform alumina washcoat to provide a uniform surface for subsequent palladium deposition. The channels were then plated with palladium by electroless plating technique. Individual channels designated for combined reforming and purification were then selectively coated with a catalytic alumina coating by sealing all other channels and then employing an identical slurry-coating method.

Experiments were performed over a range of operating temperatures, reactant feed rates and fuel-to-water ratios. Effluent analysis by gas chromatography allowed calculation of ethanol conversion, carbon dioxide, carbon monoxide and hydrogen production. Additional tests to identify the influence of liquid and gas-phase contaminants (e.g. benzene, $H_2S$) were also performed using the experimental setup. Analysis of reformate and sweep effluent allowed quantification of the overall system performance, as gauged by the following example metrics: ethanol conversion (target>95%); hydrogen extraction (target>75%); effluent carbon monoxide composition (target<1%); and effluent carbon dioxide composition (target>90%).

Target values represent realizable values for a ternary membrane system (reforming, cleanup, sweep). This research provided the necessary basis for the further incorporation of a combustion volume downstream of the cleanup volume for complete conversion of rejected hydrogen and carbon monoxide to water and carbon dioxide, respectively.

Example 2

All-in-One Hydrogen Extraction from Diesel

Reforming of logistics fuels to hydrogen for subsequent utilization in a fuel cell system in accordance with embodiments of the present disclosure includes multiple physical and chemical processes, including, without limitation, fuel vaporization, contaminant removal and high-temperature reforming stages. The need for autothermal operation (in the absence of external heat addition, typical of portable applications) generally requires additional exothermic reactions (e.g., combustion) to provide sufficient heat to maintain required reforming temperatures and supply vaporization heat. The mini- or micro-channel networks (e.g., ceramic mini- or micro-channel networks) described herein provide powerful tools for coupling all of these separate transport and kinetic processes within one single cartridge-based, highly efficient, reforming unit.

In exemplary embodiments, the present disclosure provides for an all-in-one hydrogen-from-diesel technology, by first studying the case of reforming reagent-grade methanol solutions to hydrogen. FIGS. 26-27 show two respective exemplary schemes in accordance with the present disclosure: (i) dry oxidative reforming (e.g., two-process coupling) and (ii) wet oxidative reforming (e.g., three-process coupling) for studying methanol conversion to hydrogen. FIG. 26 depicts an all-in-one reforming scheme for reforming of logistics fuels including two-process heat integration of methanol vaporization and subsequent partial oxidative reforming. FIG. 27 depicts an all-in-one reforming scheme of logistics fuels including three-process heat integration of water-methanol vaporization, steam reforming and combustion.

FIG. 28 illustrates a three-process coupling scheme, wherein the scheme is directly extended to an all-in-one reforming of diesel fuels. More particularly, FIG. 28 depicts an all-in-one reforming scheme of logistics fuels including diesel-to-hydrogen reformers utilizing hydrogen separation membranes and desulfurization. Table 6 further sets forth candidate processes for combined methanol reforming to hydrogen.

TABLE 6

Candidate Processes for combined methanol reforming to hydrogen

| Process | Overall Reaction | $\Delta H_{298}^{o1}$ (KJ/mol) | T(° C.) | Catalyst |
|---|---|---|---|---|
| Vaporization (V) | $CH_3OH_{(l)} \longleftrightarrow CH_3OH_{(g)}$ | 35.3 (@64.7° C.) | 65 | N.A. |
| | $H_2O_{(l)} \longleftrightarrow H_2O_{(g)}$ | 40.7 (@100° C.) | 100 | N.A. |
| Partial Oxidation (P) | $CH3OH(g) + \frac{1}{2}O_2 \longleftrightarrow CO_2 + 2H_2$ | −192 | 200-500 | Cu—Zn/Al$_2$O$_3$ Cu—ZnO/Al$_2$O$_3$ LaNi$_{0.95}$Co$_{0.05-}$ O$_3$/Al$_2$O$_3$ |
| Steam Reforming (S) | $CH_3OH_{(g)} + H_2O_{(g)} \longleftrightarrow CO_2 + 3H_2$ | 49.5 | 250-300 | Al—Cu—Fe Pd/ZnO CuO/ZnO/Al$_2$O$_3$ |
| Combustion (C) | $CH_3OH_{(g)} + 1.5O_2 \rightarrow O_2 + 2H_2O_{(g)}$ | −764 | >25 | Pt/Al$_2$O$_3$ |

In Table 6, the process enthalpy was at 1 atm and 298 K, unless otherwise noted for vaporization processes.

Fabrication of prototype distributors was performed using conventional machining facilities, capable of features sizes down to about 800 µm, as described herein. Distributors were designed to address mini- or micro-channel networks of about 25 to about 100 parallel channels (e.g., 5×5 to 10×10 arrays). Experiments utilized acrylic materials for low-temperature (e.g., T<200° C.) experiments measuring heat transport between non-reacting fluids with or without phase change for model verification. The distributor designs were prototyped and tested for flow uniformity via RTD analysis described herein using acrylic materials prior to construction via microfabrication.

Following low-temperature (e.g., T<200° C.) heat transfer studies and refinement of distributor design, techniques described herein may be extended to silicon using the photolithography and chemical etching techniques by microelectromechanical (MEMS) and microchemical systems. Referring again to FIG. 24, a schematic illustration of an exemplary fabrication process is provided, while complete exemplary fabrication details are included below in Table 8. In an exemplary embodiment, this fabrication method constructs four silicon plates, containing a total of eight layers including the overall microfluidic network, analogous to related techniques described herein. Fusion bonding techniques allow high-temperature, high-pressure sealing between individual plates (see, e.g., London, A. P., A. A. Ayon, A. H. Epstein, S. M. Spearing, T. Harrison, Y. Peles and J. L. Kerrebrock, "Microfabrication of a High Pressure Bipropellant Rocket Engine," Sensors and Actuators, A: Physical, 92(1-3), 351-357 (2001); Mirza, A. R., A. A. Ayon, "Silicon Wafer Bonding for MEMS Manufacturing," Solid State Technol., 42(8), 73-78 (1999)) to complete the four-wafer stack. The resulting distributor was compression-sealed to a fluidic chuck for connections to testing apparatus.

As discussed hereinabove, silicon rubbers and commercial epoxies enable low-temperature sealing (e.g., T<250° C.) of the monolith face to the distributor. For high-temperature conditions in catalytic studies, additional efforts focused upon effective sealing of silicon to ceramic surfaces. Exemplary materials include, for example: (i) alumina-based adhesives, (ii) glass-frit and/or (iii) brazing materials. Bond quality may be investigated by spectrographic mixing analysis and scanning-electron microscopy (SEM) available on-campus at the University of Connecticut in the Institute for Materials Science.

For catalytic tests, the monolith may be washcoated with alumina ($Al_2O_3$) using a slurry-coating technique discussed herein. No catalyst was introduced into vaporization channels, to minimize possibility of vapor combustion. Platinum catalyst may be introduced into combustion channels via wet impregnation with chloroplatinic acid ($H_2PtCl_6.6H_2O$). Copper and copper-oxide catalyst may be introduced into steam reforming and partial oxidation channels via wet-impregnation with copper nitrate solution followed by an optional reduction process. As an alternative to wet-impregnation, commercial Pt—$Al_2O_3$ (about 5 wt %) and Cu—$Al_2O_3$ (about 5 wt %) powders (Aldrich) may be coated directly into mini- or micro-channels.

Characterization of washcoat uniformity and catalyst deposition may be performed by scanning electron microscopy (SEM) with secondary-electron detection (SED) for elemental contrast, transmission electron microscopy (TEM), and x-ray diffraction (XRD) to determine catalyst phase composition and correlate particle size with electron microscopy data. Facilities, equipment and training/consultation for SEM, SED, TEM and XRD were provided by the Institute of Materials Science (IMS)—University of Connecticut.

Figure 29:
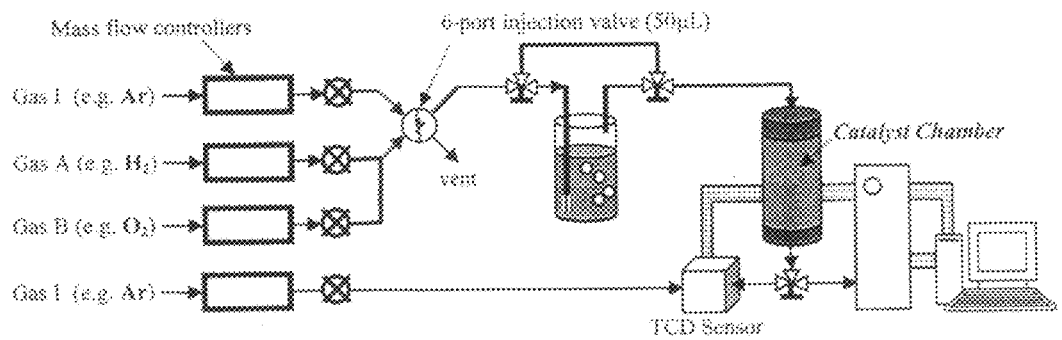
FIG. 29 is a schematic representation of an exemplary apparatus for pre-testing catalyst coatings in accordance with the present disclosure.

Catalyst coatings may be tested to determine dispersion, activity and selectivity, employing the experimental apparatus illustrated in FIG. 29. Catalyst active surface area was determined by hydrogen-oxygen titrations (see, e.g., Thomas, J. M. and W. J. Thomas, *Principles and Practice of Heterogeneous Catalysis*, VCH, Weinheim, 1997). Catalyst activity and selectivity was tested by passing an inert gas mixture of helium and nitrogen internal standard (about 4%) through a temperature-controlled bubbler containing the methanol fuel mixture to a temperature controlled catalyst chamber and out through an Agilent 3000A micro-gas chromatograph configured for light-gas analysis. This technique was similar to that previously employed by the present applicant for methanol partial oxidation studies (see, e.g., *Demonstration of 23 wt % Ag—Pd Micromembrane Employing 8:1 LaNi$_{0.95}$Co$_{0.05}$O$_3$/Al$_2$O$_3$ Catalyst for High-Purity Hydrogen Generation*," Adv. Mater., 18, 1701-1704 (2006)).

Measurements of residence time distributions (RTD) in the mini- or micro-channel networks by established methods may allow quantification of distribution uniformity for verifying heat transfer data while providing a comparison with microfabricated networks reported in the literature (e.g., Trachsel, F., A. Gunther, S. Khan and K. F. Jensen, "*Measurement of Residence Time Distribution in Microfluidic Systems*," Chem. Eng. Sci., 60(21), 5729-5737 (2005)). Tracer pulse injections coupled with effluent spectrographic analysis allows (i) detection of bulk mixing between parallel channels resulting from poor sealing and (ii) estimation of velocity distribution through the mini- or micro-channel network. Effluent spectrographic analysis may allow detection of diffusional mixing between parallel flows resulting from wall porosity, to ensure heat transfer experiments were performed in the absence of mass transfer effects. Separate RTD measurements of isolated individual channels allow estimation of single-channel dispersion coefficients, to be employed in modeling efforts.

Heat transfer studies between non-reacting fluids may be performed with and without vaporization to quantify transport rates and verify models. Overall heat transfer rates under non-reacting conditions may be calculated by monitoring inlet and outlet temperatures for both hot and cold flows, while thermal profiles in the axial direction for both co- and countercurrent flow are obtained by inclusion of multiple thermocouples within the monolith wall. Data acquisition may be automated through a PC equipped with Labview software, for example, A thermal video camera located in the Connecticut Global Fuel Cell Center ("CGFCC") allows continuous thermal imaging experiments to further support this work. Experiments may be performed over a range of fluid thermal properties and velocities to fully investigate influence upon heat transfer in mini- or micro-channel networks.

Figure 30:
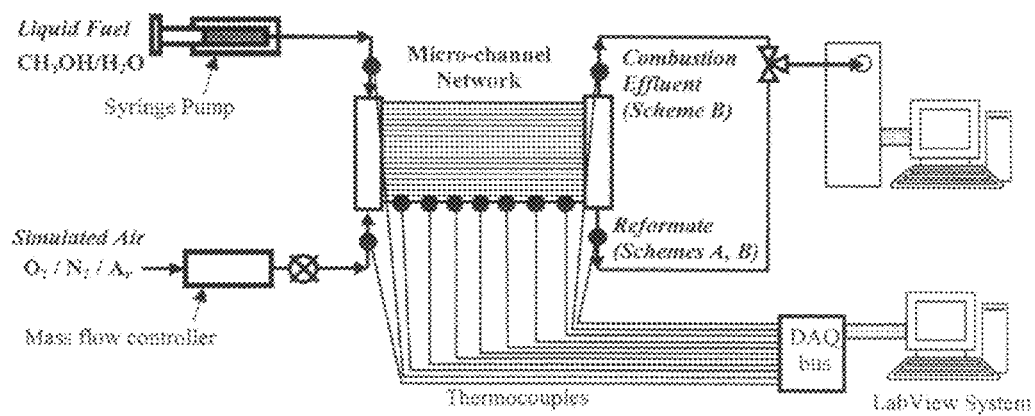
FIG. 30 is a schematic representation of an exemplary apparatus for monitoring reaction progression and thermal profiles for the reaction schemes.

Following construction of high-temperature MEMS-fabricated distributors and packaging with appropriated coated catalytic microchannel networks, experiments were performed employing two all-in-one reforming schemes, as discussed above. Monitoring of solid-phase temperature gradients and inlet and outlet temperatures in the presence of chemical reaction was performed as detailed above. Measurement of gas effluent compositions via gas chromatography provides calculation of reaction conversion and selectivities for each reaction, as shown in FIG. 30. FIG. 30 depicts an exemplary testing apparatus for monitoring reaction progression and thermal profiles. Reaction progression and temperature profiles obtained experimentally were compared with multi-dimensional models described below.

In parallel to experimental efforts, modeling of the mini- or micro-channel network may be performed to predict temperature gradients within the solid phase resulting from radial distribution patterns, and their influence on heat transfer efficiency. Developed models may provide insight for appropriate design of experimental systems. Information obtained from thermal modeling may also be employed in conjunction with mechanical models predicting thermally-induced strain to determine conditions for onset of mechanical failure.

The modeling analysis associated with the present implementation focused upon solid-phase conduction during heat transfer in mini- or micro-channel systems. One-dimensional expressions for the fluid phase were employed, and results from this work provided the necessary data to support two- and three-dimensional computational fluid dynamic (CFD) modeling of each fluid phase.

Following previous analysis (see, e.g., Stief, T., O.-U. Langer and K. Schubert, "*Numerical Investigations of Optimal Heat Conductivity in Micro Heat Exchangers,*" *Chem. Eng. Technol.*, 21(4), 297-303 (1999); Peterson, R. B., "*Numerical Modeling of Conduction Effects in Microscale Counterflow Heat Exchangers,*" *Microscale Thermophysical Engineering*, 3, 17-30 (1999); Frauhammer, J., G. Eigenberger, L. v. Hippel, and D. Arntz, "*A New Reactor Concept for Endothermic High-Temperature Reactions,*" *Chem. Eng. Sci.*, 54(15-16), 3661-3670 (1999); and Ramaswamy, R. C., P. A. Ramachandran and M. P. Dudukovic, "*Recuperative Coupling of Exothermic and Endothermic Reactions,*" *Chem. Eng. Sci.*, 61(2), 459-472 (2006)) conservation of mass for species i in fluid phase k (=1, 2, . . . ) may be described by one-dimensional models accounting for convection, dispersion and reaction at steady-state as follows:

$$\frac{dF_{i,k}}{dz} - D_{eff,k} \cdot A_c \frac{d^2 F_{i,k}}{dz^2} = \tag{1}$$

$$-A_c \cdot \sum_{n=1}^{N} r_n^{Ho}(F_{i,k}, T_k) + \sum_{p=1}^{P} \int r_p^{He}(F_{i,k}, T_w) dS_{W,k}$$

where $F_{i,k}$ is the molar flowrate of species i in fluid k, $T_k$ is temperature of $k^{th}$ fluid, $T_W$ is the wall temperature, $r_{n,k}^{Ho}$ is the volumetric rate of homogeneous reaction n, $r_{p,k}^{He}$ is the surface rate of heterogeneous reaction m, $D_{eff,k}$ is the effective mass dispersion coefficient, $A_c$ is the microchannel cross-sectional area within which n homogeneous reactions occur, and $S_{W,k}$ is the catalytic wall surface upon which p catalytic reactions occur. Likewise, energy balance of each fluid phase (k=1, 2, . . . ) can be written as:

$$\frac{d(\dot{m}_k \overline{C}_{p,k} T_k)}{dz} - \lambda_{eff,k} \cdot A_c \frac{d^2 T_k}{dz^2} = \tag{2}$$

$$h_k \cdot \int (T_W - T_k) \cdot dS_{W,k} + A_c \cdot \sum_{n=1}^{N} r_{n,k}^{Ho}(F_{i,k}, T_W) \cdot \Delta H_{rxn}^o$$

where $\dot{M}_k$ is total molar flow in channel, $\overline{C}_{p,k}$ is averaged molar heat capacity, $\lambda_{eff,k}$ is the effective heat dispersion coefficient, $S_{W,k}$ is the wall surface available for heat exchange with fluid k (nominally the channel perimeter), and $h_k$ is the fluid-solid heat transfer coefficient.

Heat conduction within the solid phase can be modeled by Laplace's equation, assuming all heat generation occurs either within the fluid-phase (via homogeneous reaction or phase change) or at the fluid-solid surface (for catalytic reaction), $$\nabla^2(k_W T_W) = 0 \tag{3}$$

with general boundary conditions at walls equating heat fluxes at the fluid-solid interfaces with heat generation from catalytic reaction, as follows:

$$\frac{\partial T}{\partial x}\bigg|_S = \frac{\partial T}{\partial y}\bigg|_S = \sum_{m=1}^{M} r_{m,k}^{He}(F_{i,k}, T_W) \cdot \Delta H_{rxn}^o + h_k(T|_S - T_k) \tag{4}$$

Inlet conditions for each fluid are dictated by feed temperature, composition and overall flowrate, recognizing that for the case of counter-flow, initial conditions must be solved iteratively to satisfy inlet conditions at z=L via shooting method. Two sets of axial boundary conditions can be employed for the solid phase to model either perfectly insulating (5) or isothermal packaging (6) of the microchannel reactor, as follows:

$$\frac{dT_W}{dz} = 0 \quad @z = 0, L \tag{5}$$

or $$T_W = \text{fixed} \quad @z = 0, L \tag{6}$$

In either case, boundary conditions exist as one initial condition for numerical solution and one final condition requiring shooting-method for determining either flux or initial temperature conditions at z=L to satisfy. Isothermal axial boundary conditions can be calculated by assuming thermal equilibration of all fluids either upstream or downstream of the micro-channel network.

For the case of heat transfer between two homogeneous fluids in the absence of chemical reaction or phase change, equation (2) can be rewritten for each fluid in the form of equations (1a,b). For the case of one-dimensional (e.g., axial) heat conduction in the solid phase, Laplace's equation and appropriate wall boundary conditions simplify to equation (2a). These are cast in dimensionless terms of the number of transfer units (NTU) and fluid conductivity parameter, $\lambda$, following the analysis of Peterson (1999), $$\frac{d\Theta_1}{dz^*} = NTU_1 \cdot (\Theta_W - \Theta_1) \quad (1a)$$

$$\frac{d\Theta_2}{dz^*} = NTU_2 \cdot (\Theta_W - \Theta_2) \quad (1b)$$

$$\frac{d^2\Theta_W}{dz^{*2}} = \frac{NTU_1}{\lambda_1} \cdot (\Theta_W - \Theta_1) + \frac{NTU_2}{\lambda_2} \cdot (\Theta_W - \Theta_2) \quad (2a)$$

$$NTU_i = \frac{h_i A_i}{\dot{m}_i C_{p,i}}, \lambda_i = \frac{k_w A_w}{\dot{m}_i C_{p,i} L}, \Theta_i = \frac{T_i - T_{2,in}}{T_{1,in} - T_{2,in}}, z^* = z/L$$

where $A_i$ is the heat transfer surface area of channel i, and $A_w$ is the cross-sectional area of the solid phase. Solution strategy involves marching technique combined with shooting method to satisfy boundary conditions at opposite end. Countercurrent modeling requires a dual-shooting method, accomplished using a pre-packaged multivariable minimization algorithm available in Matlab, for example.

Figure 31:
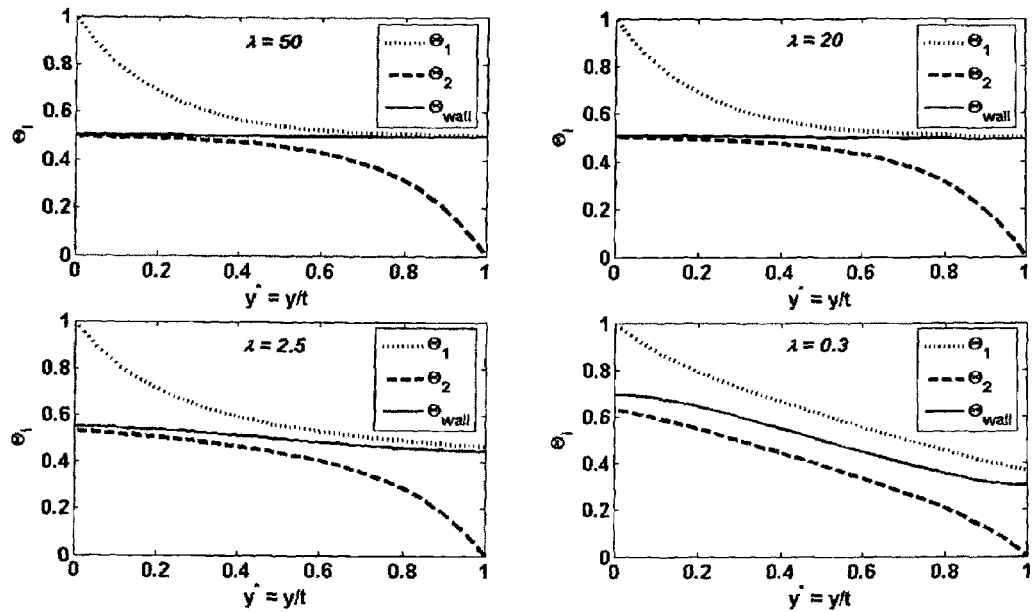
FIG. 31 graphically depicts one dimensional simulations of axial temperature profiles for representative mini- or micro-channel conditions for varying wall material and thermal conductivity in accordance with exemplary embodiments of the present disclosure.

Analysis of the one-dimensional model for countercurrent heat exchange demonstrates the significant influence of intermediate wall thermal conductivities upon thermal efficiency, and the importance of solid-phase modeling for mechanical analysis. A representative mini-channel for heat transfer is assumed with a hydraulic diameter of about 1 mm, flow length of about 25 mm and wall thickness of about 0.2 mm. Assuming air flow at about 0.5 m/s and estimating heat transfer coefficient as 30 W/m²K from the correlation of Sieder, E. N. and G. E. Tate, "*Heat Transfer and Pressure prop of Liquids in Tubes*," Ind. Eng. Chem., 28(12), 1429-1435 (1936) for laminar flow in cylindrical pipe, the number of transfer units (NTU) were estimated. Conductivity parameters ($\lambda$) of 0.1, 1, 10 and 25 were used to model influence of cordierite, stainless steel, silicon and copper on one-dimensional temperature profiles. The resulting solution of equations for countercurrent heat exchange illustrates that copper, silicon and stainless steel generally behave as isothermal slabs, leading to thermal equilibration of all phases, as shown in FIG. 31. For the case of cordierite, significant improvement in heat exchange was visible, resulting from development of temperature gradients along the solid-phase axial length. Modeling analysis thus demonstrates the importance of intermediate wall thermal conductivities for micro-channel heat exchanger efficiency. Under such conditions radial temperature uniformity is not expected, and the influence of radial conduction upon overall heat transfer must also be considered. A detailed review of the importance of low-thermal conductivity ceramics in micro-reactor design, as employed in exemplary embodiments of the present disclosure, is discussed in Moreno, A., Murphy, K., Wilhite, B. A., "*Parametric Study of Solid-Phase Axial Heat Conduction in Thermally Integrated Microchannel Networks,*" Industrial & Engineering Chemistry Research, ASAP Article, DOI: 10.1021/ie8001638 (2008), the entire contents of which is hereby incorporated by reference in its entirety.

Two-dimensional conduction modeling of the solid-phase between two parallel fluids allows determination of the influence of transverse conduction resistance upon resulting solid-phase temperature gradients and maintenance of desired temperature gradients between each catalytic process, as a function of wall thickness. Equations (1a,b) are coupled with the two-dimensional form of equation (3) and insulating boundary conditions (5) employed for solution. The resulting system of partial and ordinary differential equations is governed by the same two dimensionless groups as before.

Figure 32:
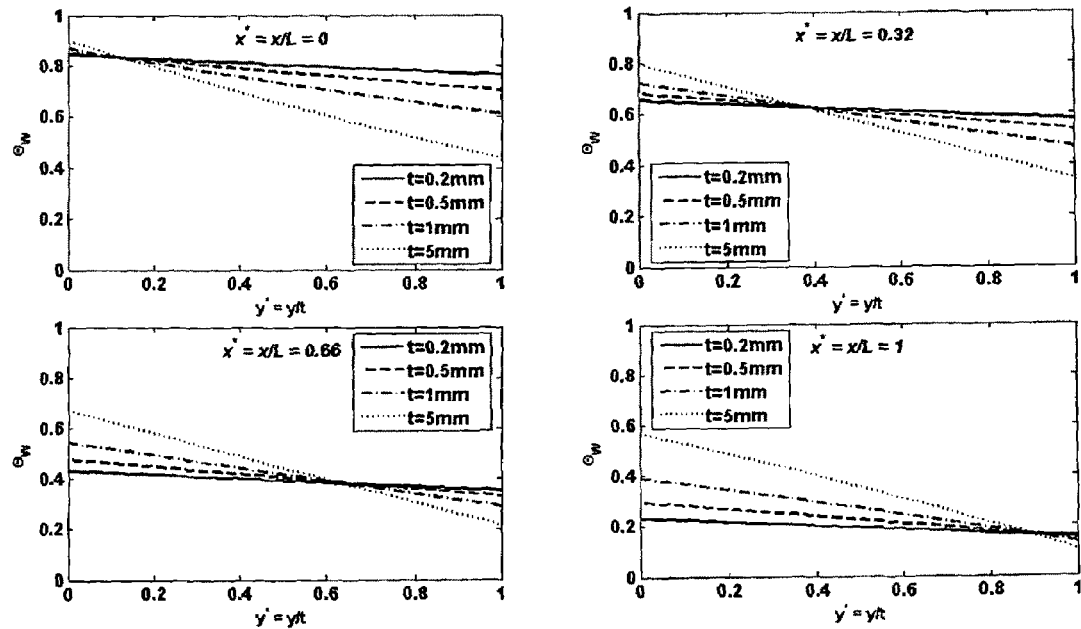
FIG. 32 graphically depicts a solution of two-dimensional temperature profiles within heat conducting cordierite wall in accordance with exemplary embodiments of the present disclosure.

A coarse solution was obtained using the method of finite differences over a 20×45 grid of elements. Resulting radial temperature profiles at four axial positions, employing parameters for cordierite in Table 7 at varying monolith wall thicknesses are shown in FIG. 32. Results demonstrate that even for the case of very thin walls (e.g., about 0.2 mm), finite temperature gradients can still be expected, up to 3-4% of total temperature difference within the system. For thick-walled monoliths (e.g., t>1 mm), gradients up to 30% of maximum temperature drop are expected. For high-temperature applications such as coupled methane reforming and combustion, the total temperature difference can increase over 500 K, corresponding to significant radial temperature gradients in the solid phase.

TABLE 7

Values used for one-dimensional prediction of mini-channel heat exchanger performance

|  | Copper | Silicon | Stainless Steel | Cordierite |  |
| --- | --- | --- | --- | --- | --- |
| $h_a$ | 30 | 30 | 30 | 30 | W/m² · K |
| $A_1, A_2$ | $0.8 \times 10^{-6}$ | $0.8 \times 10^{-6}$ | $0.8 \times 10^{-6}$ | $0.8 \times 10^{-6}$ | m² |
| $m_1, m_2$ | $5 \times 10^{-4}$ | $5 \times 10^{-4}$ | $5 \times 10^{-4}$ | $5 \times 10^{-4}$ | g/s |
| $Cp_1, Cp_2$ | 1 | 1 | 1 | 1 | J/g · K |
| NTU | 5 | 5 | 5 | 5 |  |
| $A_w$ | $1.64 \times 10^{-6}$ | $1.64 \times 10^{-6}$ | $1.64 \times 10^{-6}$ | $1.64 \times 10^{-6}$ | m² |
| L | $25 \times 10^{-3}$ | $25 \times 10^{-3}$ | $25 \times 10^{-3}$ | $25 \times 10^{-3}$ | m |
| $K_w$ | 380 | 150 | 20 | 2.5 | W/m · K |
| $\lambda$ | 50 | 20 | 2.5 | 0.3 |  |

The above modeling analysis for predicting fluid heat transfer and solid-phase temperature gradients was extended to the case of reacting fluids, initially employing published rate expressions, and subsequently with experimentally determined rates, for the reaction systems proposed above. For the present model, incorporation of reaction terms in fluid model equations (1-2) did not significantly alter the complexity of the mathematical system or the solution technique. The effects of complexities in the fluid phase, e.g. Taylor-Aris Dispersion effects and maldistribution, via two- and three-dimensional models of each fluid, may be investigated using the present modeling analysis.

Finite elements solutions for the case of two- and three-dimensional modeling of the solid-phase were carried out using FEMLAB software, available through the Connecticut Global Fuel Cell Center (CGFCC), and the results therefrom provide a basis for the use of computational fluid dynamics (CFD) software, e.g., Fluent, to incorporate two- and three-dimensional fluid modeling in conjunction with present solid-phase modeling.

In exemplary embodiments, the present disclosure provides for a new and improved class of highly integrated mini- or micro-channel reactors, capable of integrating at least three or more distinct reactor processes for unrivalled heat integration and portability for portable power applications, while enabling fundamental investigations into heat transfer within mini- or micro-channel systems. Thus, this provides a breakthrough in the design of portable reactors or fuel reformers capable of efficiently converting fuels to hydrogen. Product hydrogen can then be employed by next generation electrochemical systems (e.g., fuel cell systems) at efficiencies significantly greater than conventional combustion engine systems.

TABLE 8

Details of Exemplary Microfabrication Process

WAFER 1: CONTAINS LAYERS A, B, C Starting Material: Si(100) DSP, 4" 500 micron
1.1. Clean and Preparation
    1.1.a. RCA clean wafers
    1.1.b. Grow thermal oxide, 500 nm
1.2. Form Through-Holes Nested Mask in Oxide
    1.2.a. Piranha clean wafers, rinse and spin dry
    1.2.b. HMDS coat wafer for resist
    1.2.c. Spin photoresist, thin, positive
    1.2.d. Pre-bake photoresist
    1.2.e. Align, expose wafer to mask (B)
    1.2.f. Develop resist
    1.2.g. Post-bake to set photoresist
    1.2.h. BOE (8:1 H2 O:HF) etch oxide, rinse and spin dry
1.3. Form Frontside Fluidic Pattern
    1.3.a. Piranha clean wafers, rinse and spin dry
    1.3.b. HMDS coat wafer for resist
    1.3.c. Spin photoresist, thick, positive
    1.3.d. Pre-bake photoresist
    1.3.e. Align, expose wafer to mask (A)
    1.3.f. Develop resist
    1.3.g. Post-bake to set photoresist
    1.3.h DRIE etch wafer, 350 micron depth in through holes
1.4. Form Backside Fluidic Pattern
    1.4.a. Piranha clean wafers, rinse and spin dry
    1.4.b. HMDS coat wafer for resist
    1.4.c. mount wafer to handle wafer using target mount, frontside down
    1.4.d. Pre-bake to set wafer mounting
    1.4.e. Spin photoresist, thick, positive
    1.4.f. Pre-bake photoresist
    1.4.g. Align, expose wafer to mask (C)
    1.4.h Develop resist
    1.4.i. Post-bake mounted wafer
    1.4.j. DRIE etch wafer, 350 micron depth, until pattern connects with through-holes
    1.4.k. Piranha clean, dismount wafer
WAFER 2: CONTAINS LAYER D Starting Material: Si(100) DSP, 4" 250 micron
2.1. Clean and Preparation
    2.1.a. RCA clean wafers
    2.1.b. Grow thermal oxide (500 nm)
2.2. Form Frontside Fluidic Pattern
    2.2.a. Piranha clean wafers, rinse and spin dry
    2.2.b. HMDS coat wafer for resist
    2.2.c. Spin photoresist, thick, positive
    2.2.d. Pre-bake photoresist
    2.2.e. Align, expose wafer to mask (D)
    2.2.f. Develop resist
    2.2.g. Post-bake to set photoresist
    2.2.h. BOE (8:1 H2 O:HF) etch oxide, rinse and spin dry
    2.2.i DRIE etch wafer, 650 micron depth in through holes
    2.2.j. Piranha clean, dismount wafer
BOND WAFERS 1 AND 2
    3.1.a. Piranha clean wafers 1 and 2, rinse and spin dry
    3.1.b. airbrush photoresist on wafer 2 backside
    3.1.c. post-bake set resist
    3.1.d. BOE (8:1 H2 O:HF) etch strip protective oxide from bonding surfaces
    3.1.e. Piranha clean wafers 1 and 2, rinse and spin dry
    3.1.f. Align wafer 1 and wafer 2, using alignment marks on mask A, D
    3.1.g. Fusion bond wafers
    3.1.h. Anneal wafer stack at 1100° C. to strengthen bond

TABLE 8-continued

Details of Exemplary Microfabrication Process

WAFER 3: CONTAINS LAYERS E, F, G Starting Material: Si(100) DSP, 4" 500 micron
4.1. Clean and Preparation
    4.1.a. RCA clean wafers
    4.1.b. Grow thermal oxide, 500 nm
4.2. Form Through-Holes Nested Mask in Oxide
    4.2.a. Piranha clean wafers, rinse and spin dry
    4.2.b. HMDS coat wafer for resist
    4.2.c. Spin photoresist, thin, positive
    4.2.d. Pre-bake photoresist
    4.2.e. Align, expose wafer to mask (F)
    4.2.f. Develop resist
    4.2.g. Post-bake to set photoresist
    4.2.h. BOE (8:1 H2 O:HF) etch oxide, rinse and spin dry
4.3. Form Frontside Fluidic Pattern
    4.3.a. Piranha clean wafers, rinse and spin dry
    4.3.b. HMDS coat wafer for resist
    4.3.c. Spin photoresist, thick, positive
    4.3.d. Pre-bake photoresist
    4.3.e. Align, expose wafer to mask (E)
    4.3.f. Develop resist
    4.3.g. Post-bake to set photoresist
    4.3.h DRIE etch wafer, 350 micron depth in through holes
4.4. Form Backside Fluidic Pattern
    4.4.a. Piranha clean wafers, rinse and spin dry
    4.4.b. HMDS coat wafer for resist
    4.4.c. mount wafer to handle wafer using target mount, frontside down
    4.4.d. Pre-bake to set wafer mounting
    4.4.e. Spin photoresist, thick, positive
    4.4.f. Pre-bake photoresist
    4.4.g. Align, expose wafer to mask (G)
    4.4.h Develop resist
    4.4.i. Post-bake mounted wafer
    4.4.j. DRIE etch wafer, 350 micron depth, until pattern connects with through-holes
    4.4.k. Piranha clean, dismount wafer
WAFER 4: CONTAINS LAYER H Starting Material: Si(100) DSP, 4" 250 micron
5.1. Clean and Preparation
    5.1.a. RCA clean wafers
    5.1.b. Grow thermal oxide (500 nm)
2.2. Form Frontside Fluidic Pattern
    5.2.a. Piranha clean wafers, rinse and spin dry
    5.2.b. HMDS coat wafer for resist
    5.2.c. Spin photoresist, thick, positive
    5.2.d. Pre-bake photoresist
    5.2.e. Align, expose wafer to mask (G)
    5.2.f. Develop resist
    5.2.g. Post-bake to set photoresist
    5.2.h. BOE (8:1 H2 O:HF) etch oxide, rinse and spin dry
    5.2.i. DRIE etch wafer, 650 micron depth in through holes
    5.2.j. Piranha clean, dismount wafer
BOND WAFERS 3 AND 4
    6.a. Piranha clean wafers 3 and 4, rinse and spin dry
    6.b. airbrush photoresist on wafer 3 frontside (D) and wafer 2 backside (G)
    6.c. post-bake set resist
    6.d. BOE (8:1 H2 O:HF) etch strip protective oxide from bonding surfaces
    6.e. Piranha clean wafers 3 and 4, rinse and spin dry
    6.f. Align wafer 3 to wafer 4, using alignment marks on mask E, H
    6.g. Fusion bond wafer stack
    6.h. Anneal wafer stack at 1100° C. to strengthen bond
BOND STACK 1/2 to STACK 3/4
    7.a. Piranha clean stack 1/2 and stack 3/4
    7.b. BOE (8:1 H2 O:HF) strip protective oxide from remaining bonding surfaces
    7.c. Align stack 1/2/ to stack 3/4/ using alignment marks on mask A, H
    7.d. Fusion bond wafer stack
    7.e. Anneal wafer stack at 1100° C. to strengthen bond
DIESAW.

Table 8 illustrates a detailed flow-sheet organizing each step of the fabrication process in linear progression.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A chemical reactor, comprising:
   a plurality of elongate reaction chambers defining an arrangement, the plurality of elongate reaction chambers including at least a first elongate chamber adapted to support a first reactor function occurring therewithin associated with a first process feed, a second elongate chamber adapted to support a second reactor function occurring therewithin associated with a second process feed, and a third elongate chamber adapted to support a third reactor function occurring therewithin associated with a third process feed, each of the first, second, and third reactor functions being distinct from each other of the first, second, and third reactor functions, and each of the first, second, and third process feeds being distinct from each other of the first, second, and third process feeds; and
   a distributor mounted with respect to the arrangement and in fluidic communication with each of the elongate chambers of the plurality thereof, the distributor configured and dimensioned to distribute at least one fluid to each elongate chamber and to produce a two-dimensional radial distribution of fluidic flow through at least the first, second, and third elongate chambers with respect to the first, second, and third process feeds;
   wherein the arrangement and the distributor manifest an interchangeable cartridge-based system, the arrangement of the plurality of elongate chambers being selectably detachable from the distributor and selectably replaceable with one of a plurality of mountable arrangements of elongate chambers; and
   wherein each arrangement of the plurality of arrangements is defined by a plurality of elongate reaction chambers, each elongate chamber in fluidic communication with the distributor when mounted with respect to the distributor.

2. The chemical reactor of claim 1, further comprising a bundle of extruded channels, wherein the bundle of extruded channels includes at least the plurality of elongate chambers of the arrangement mounted with respect to the distributor.

3. The chemical reactor of claim 1, further comprising a monolith catalyst support including an N×M array of channels, wherein the channels of the N×M array thereof include at least the plurality of elongate chambers of the arrangement mounted with respect to the distributor.

4. The chemical reactor of claim 1, wherein at least one of the plurality of elongate chambers of the arrangement mounted with respect to the distributor is defined by walls formed from at least one selected from the group consisting of cordierite ($2MgO-2Al_2O_3-5SiO_2$), mullite ($3Al_2O_3-2SiO_2$), alumina ($Al_2O_3$), activated carbon, and copper.

5. The chemical reactor of claim 1, wherein at least one of the plurality of elongate chambers of the arrangement mounted with respect to the distributor is defined by walls including a microporous material layer for introducing catalytic activity.

6. The chemical reactor of claim 5, wherein the microporous material layer is formed via at least one selected from a group consisting of washcoating and impregnation.

7. The chemical reactor of claim 1, wherein at least one of the plurality of elongate chambers of the arrangement mounted with respect to the distributor is defined by walls including a perm-selected film for hydrogen purification.

8. The chemical reactor of claim 1, wherein at least one of the plurality of elongate chambers of the arrangement mounted with respect to the distributor manifests a membrane reaction configuration for combining hydrogen generation with purification.

9. The chemical reactor of claim 1, wherein the mounted distributor is further configured and dimensioned to receive an input fluid and discharge substantially pure hydrogen and substantially pure carbon dioxide.

10. The chemical reactor of claim 9, wherein the input fluid is a fuel or bio-fuel.

11. The chemical reactor of claim 1, wherein the distributor and the plurality of elongate chambers of the arrangement mounted with respect to the distributor are configured and dimensioned to perform an integrated, multi-stage process of hydrogen extraction.

12. The chemical reactor of claim 1, wherein at least some of the plurality of elongate chambers of the arrangement mounted with respect to the distributor manifest a ceramic mini- or micro-channel network.

13. The chemical reactor of claim 12, wherein the network further includes composite catalyst membranes for hydrogen coupling of alcohols.

14. The chemical reactor of claim 1, wherein the plurality of elongate chambers of the arrangement mounted with respect to the distributor are extruded mini-channels or micro-channels.

15. The chemical reactor of claim 1, wherein at least some of the plurality of elongate chambers of the arrangement mounted with respect to the distributor manifest a coupling of catalytic reforming membranes with non-catalytic gas cleanup membranes.

16. The chemical reactor of claim 1, wherein the plurality of elongate chambers of the arrangement mounted with respect to the distributor manifest a complex flow distribution scheme for at least one member selected from the group consisting of: i) combining catalytic combustion with endothermic reforming, ii) combining combustion with vaporization, iii) combining combustion, reforming, and vaporization, and iv) coupling fuel reforming with hydrogen production.

17. The chemical reactor of claim 1, wherein each plurality of elongate reaction chambers of each arrangement includes at least a first elongate chamber adapted to support a first reactor function occurring therewithin associated with a first process feed, a second elongate chamber adapted to support a second reactor function occurring therewithin associated with a second process feed, and a third elongate chamber adapted to support a third reactor function occurring therewithin associated with a third process feed;

wherein each of the first, second, and third reactor functions is distinct from each other of the first, second, and third reactor functions, and each of the first, second, and third process feeds is distinct from each other of the first, second, and third process feeds; and wherein when mounted with respect to the distributor, the distributor is configured and dimensioned to distribute at least one fluid to each elongate chamber and to produce a two-dimensional radial distribution of fluidic flow through at least the first, second, and third elongate chambers with respect to the first, second, and third process feeds.

18. The chemical reactor of claim 1, wherein the distributor is fabricated via at least one process selected from a group consisting of machining, micromachining, microelectromechanical systems (MEMS) photolithography and chemical etching techniques, and fusion bonding of separately machined plates.

19. The chemical reactor of claim 17, wherein the distributor includes respective first and second flow distribution heads having respective ends;

wherein when the distributor is mounted with respect to each arrangement, the ends of the first and second flow distribution heads are coupled to opposite corresponding ends of each arrangement and respectively arranged in fluidic communication with each of the elongate chambers of the plurality, each of the first and second flow distribution heads being fluidically sealed with respect to the respective corresponding end of each arrangement.

20. The chemical reactor of claim 19, wherein each flow distribution head is sealed via at least one sealing material for enabling effective sealing at temperatures less than about 250° C.

21. The chemical reactor of claim 1, wherein the first process feed is a reforming feed, the second process feed is a gas cleanup feed, and the third process feed is a sweep feed; and further comprising a first fluidic reservoir arranged in fluidic communication with the distributor for providing a reactant fluid associated with the first and second feeds, and a second fluidic reservoir arranged in fluidic communication with the distributor for providing a fluid associated with the third feed.

* * * * *